(12) United States Patent
Matsugashita

(10) Patent No.: US 10,412,075 B2
(45) Date of Patent: Sep. 10, 2019

(54) AUTHORIZATION SERVER, NON-TRANSITORY COMPUTER-READABLE MEDIUM, AND AUTHORITY DELEGATING SYSTEM

(71) Applicant: CANON KABUSHIKI KAISHA, Tokyo (JP)

(72) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 15/802,555

(22) Filed: Nov. 3, 2017

(65) Prior Publication Data

US 2018/0145967 A1 May 24, 2018

(30) Foreign Application Priority Data

Nov. 18, 2016 (JP) ................................. 2016-225381

(51) Int. Cl.
| | |
|---|---|
| H04L 29/06 | (2006.01) |
| G06F 21/33 | (2013.01) |
| H04L 9/32 | (2006.01) |
| G06F 21/62 | (2013.01) |
| H04L 9/08 | (2006.01) |
| H04L 29/08 | (2006.01) |

(52) U.S. Cl.
CPC ........ H04L 63/0807 (2013.01); G06F 21/335 (2013.01); G06F 21/6263 (2013.01); H04L 9/0833 (2013.01); H04L 9/3213 (2013.01); H04L 63/10 (2013.01); H04L 67/02 (2013.01)

(58) Field of Classification Search
USPC .......................................................... 726/10
See application file for complete search history.

(56) References Cited

U.S. PATENT DOCUMENTS

| | | | | |
|---|---|---|---|---|
| 7,451,157 B2* | 11/2008 | Kaler | ...................... | H04L 45/34 |
| 8,015,204 B2* | 9/2011 | Kaler | .................. | G06F 21/6218 |
| | | | | 707/783 |
| 8,402,508 B2* | 3/2013 | Rouskov | ............... | G06F 21/335 |
| | | | | 726/2 |
| 8,839,376 B2* | 9/2014 | Durbha | ................. | H04L 63/102 |
| | | | | 713/171 |

(Continued)

FOREIGN PATENT DOCUMENTS

JP          2015-095056 A      5/2015

*Primary Examiner* — Amare F Tabor

(74) *Attorney, Agent, or Firm* — Cowan, Liebowit & Latman, P.C.

(57) ABSTRACT

An authorization server, comprises: receiving from a client an authorization request in which a scope group, with which one or a plurality of scopes that define an extent for using a Web service are associated, is designated; presenting to a user, in a case where one or more scopes among the one or a plurality of scopes associated with the scope group are included in an extent of an authority that the user has, a screen for accepting an authorization operation corresponding to the authorization request; issuing to the client, in accordance with accepting the authorization operation of the user corresponding to the authorization request via the screen, authorization information relating to the scope group; and issuing, in accordance with accepting an authorization token request based on the issued authorization information, an authorization token corresponding to the scope group.

10 Claims, 15 Drawing Sheets

(56) References Cited

U.S. PATENT DOCUMENTS

| | | | |
|---|---|---|---|
| 9,172,701 B2 * | 10/2015 | Burch | G06F 21/00 |
| 9,225,744 B1 * | 12/2015 | Behm | H04L 63/20 |
| 9,230,089 B2 * | 1/2016 | Angal | G06F 21/44 |
| 2010/0306547 A1 * | 12/2010 | Fallows | G06F 21/305 |
| | | | 713/178 |

* cited by examiner

FIG. 6A
AUTHORIZATION SERVER MODULE USER TABLE

|  | USER ID | UUID | PASSWORD | AUTHORITY INFORMATION |
|---|---|---|---|---|
| LINE 1 | admin@xx.com | 10000000 | administrator | administrator |
| LINE 2 |  |  |  | setting value editor |
| LINE 3 |  |  |  | setting value referencer |
| LINE 4 | user@xx.com | 10000001 | user | device setter |
| LINE 5 |  |  |  | setting value referencer |

FIG. 6B
AUTHORIZATION SERVER MODULE CLIENT TABLE

|  | CLIENT ID | SECRET | CLIENT NAME | REDIRECT URI |
|---|---|---|---|---|
| LINE 1 | c001@xx.com | xxxxxxxxxx | setting value editor | https://localhost:xx |

FIG. 6C
AUTHORIZATION SERVER MODULE SCOPE DEFINITION TABLE

|  | SCOPE ID | AUTHORITY INFORMATION | GROUP INFORMATION |
|---|---|---|---|
| LINE 1 | group | group | admin,edit,read,device |
| LINE 2 | admin | administrator |  |
| LINE 3 | edit | setting value editor |  |
| LINE 4 | read | setting value referencer |  |
| LINE 5 | device | device setter |  |

FIG. 7A

AUTHORIZATION SERVER MODULE TOKEN TABLE

| | TOKEN ID | TYPE | CLIENT ID | UUID | SCOPE | REDIRECT URI | STATE | VALIDITY PERIOD |
|---|---|---|---|---|---|---|---|---|
| LINE 1 | cd_000001 | authorization code | c001@xx.com | 10000001 | read | https://localhost.xx | valid | 2016/1/1 0:00 |
| LINE 2 | cd_000002 | authorization code | c001@xx.com | 10000001 | group | https://localhost.xx | valid | 2016/1/1 0:00 |

FIG. 7B

AUTHORIZATION SERVER MODULE TOKEN TABLE

| | TOKEN ID | TYPE | CLIENT ID | UUID | SCOPE | REDIRECT URI | STATE | VALIDITY PERIOD |
|---|---|---|---|---|---|---|---|---|
| LINE 1 | cd_000001 | authorization code | c001@xx.com | 10000001 | read | https://localhost.xx | invalid | 2016/1/1 0:00 |
| LINE 2 | cd_000002 | authorization code | c001@xx.com | 10000001 | group | https://localhost.xx | invalid | 2016/1/1 0:00 |
| LINE 3 | at_000001 | authorization token | c001@xx.com | 10000001 | read | | valid | 2016/1/1 0:00 |
| LINE 4 | rt_000001 | refresh token | c001@xx.com | 10000001 | group | | valid | 2017/1/1 0:00 |
| LINE 5 | at_000002 | authorization token | c001@xx.com | 10000001 | read | | valid | 2016/1/1 0:00 |
| LINE 6 | rt_000002 | refresh token | c001@xx.com | 10000001 | group | | valid | 2017/1/1 0:00 |

FIG. 11

```
JWT(JSON Web Token) Example

Header
{
  "alg": "RS256",
  "typ": "JWT"
}
Payload{
  "iss": "https://authorization.com/",
  "jti": "at_000002",
  "sub": "10000001",
  "azp": "c001@xx.com",
  "aud": "https://resource.com/",
  "preferred_username": "user@xx.com",
  "exp": 1472710413,
  "scopes": {
    "owner": ["read","device"],
    "group": ["group"]
  }
}

Encoded
eyJhbGciOiJSUzI1NiIsInR5cCI6IkpXVCJ9.eyJpc3MiOiJodHRwczovL2F1
dGhvcmI6YXRpb24uY29tLyIsImp0aSI6ImF0XzAwMDAwMiIsInN1Yii6IjEw
MDAwMDAxIiwiYXpwIjoiYzAwMUB4eC5jb20iLCJhdWQiOiJodHRwczovL
3Jlc291cmNlLmNvbS8iLCJwcmVmZXJyZWRfdXNlcm5hbWUiOiJ1c2VyQ
Hh4LmNvbSIsImV4cCI6MTQ3MjcxMDQxMywic2NvcGVzIjp7Im93bmVyIjp
bInJlYWQiLCJkZXZpY2UiXSwiZ3JvdXAiOlsiZ3JvdXAiXX19.xxxx
xxxxx(Signature)
```

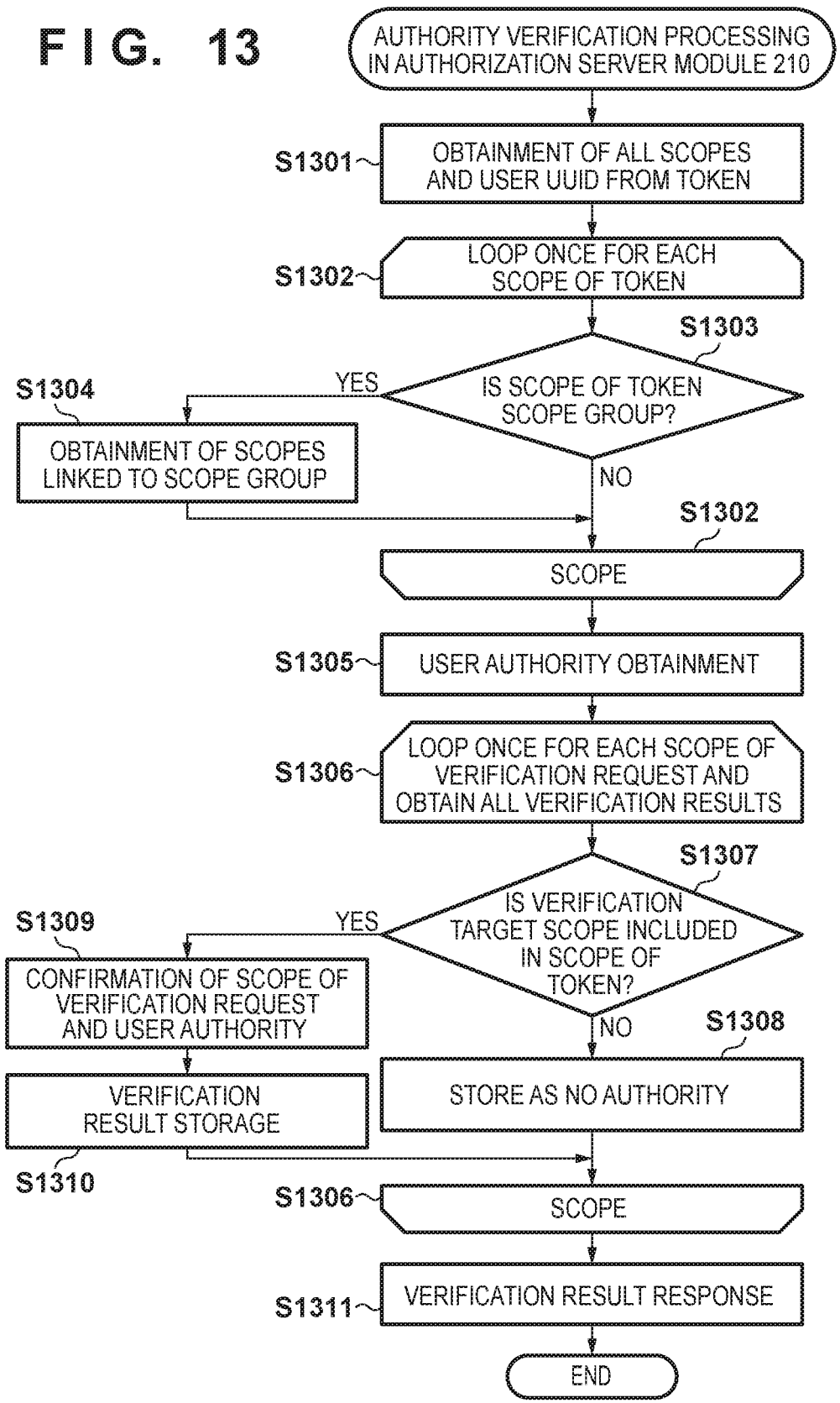

AUTHORIZATION SERVER, NON-TRANSITORY COMPUTER-READABLE MEDIUM, AND AUTHORITY DELEGATING SYSTEM

BACKGROUND OF THE INVENTION

Field of the Invention

The present invention relates to an authorization server, a non-transitory computer-readable medium, and an authority delegating system.

Description of the Related Art

In recent years, usage of so-called cloud services deployed on the Internet has spread. Cloud services individually expose Web service APIs (Application Programming Interfaces), and it is possible to use functions that the service provides via APIs from other applications and cloud services. Adoption of a standard protocol for implementing authorization cooperation called OAuth 2.0 by Web service API is developing. In Japanese Patent Laid-Open No. 2015-095056, a technique of a method of using a Web service API that uses OAuth 2.0 is disclosed.

According to OAuth 2.0, it is possible for a service B to access an API for obtaining data of a user which a service A manages, for example, to an extent that the user has allowed. At that time, the service A, after having clarified the extent of access from the service B, obtains explicit user authorization with respect to access to an API by the service B. The user performing explicit authorization is referred to as an "authorization operation". Also, the extent of access is referred to as "scope" in OAuth 2.0, and whether to permit access to data is decided according to the scope.

When a user performs an authorization operation, the service B receives a token (hereinafter referred to as an "authorization token") for certifying that access to data within the extent that a user in the service A permitted is allowed. In the service B, access to an API of the service A thereafter can be realized using the authorization token. Authorizing the service B to access a user resource by a user authorization operation is referred to as "authority delegation". Note that in OAuth 2.0, a server that issues an authorization token based on a user authorization operation is referred to as an "authorization server". Also, a server that exposes an API is referred to as a "resource server" and an agent that calls an API is referred to as a "client".

In OAuth 2.0, an authorization server and a resource server can be configured on the same server, but in a large-scale system where there are multiple resource servers, an authorization server is normally configured as an independent server. In this case, the service A makes a request to the authorization server for verification of an authorization token obtained whenever an API is used from the service B. Then, based on the result of the verification, it decides whether to permit the usage of the API. Here, there is a problem in that the load is concentrated on the authorization server in a large-scale system. With respect to this problem, use of a signed authorization token as a means for verifying an authorization token oneself without the service A making a request for verification to the authorization server has been studied. The service A, by verifying the signature of a received signed authorization token, can determine whether the authorization token is valid without confirming with the authorization server.

In a protocol that enables an authority delegation, there is the possibility of a lack of flexibility corresponding to changing a resource in a service and changing an authority of a user. For example, an OAuth 2.0 authorization token assumes that the authority delegation is made for only the scope confirmed when the user performs the authorization operation. Thus, in a case where the scope in which the user can perform the authority delegation is changed, and when there is an increase/decrease/change in the scope for API usage, there is the possibility that the user will be once again forced to perform an authorization operation in order to use an API, and so it is possible that convenience will suffer.

SUMMARY OF THE INVENTION

The present invention was conceived in view of the above described problem, and provides an authority delegating system that can change a user authority or scope definition without impairing user convenience.

According to one aspect of the present invention, there is provided an authorization server, comprising: a receiving unit configured to receive from a client an authorization request in which a scope group, with which one or a plurality of scopes that define an extent for using a Web service are associated, is designated; a presenting unit configured to present to a user, in a case where one or more scopes among the one or a plurality of scopes associated with the scope group are included in an extent of an authority that the user has, a screen for accepting an authorization operation corresponding to the authorization request; a first issuing unit configured to issue to the client, in accordance with accepting the authorization operation of the user corresponding to the authorization request via the screen, authorization information relating to the scope group; and a second issuing unit configured to issue, in accordance with accepting an authorization token request based on the authorization information issued by the first issuing unit, an authorization token corresponding to the scope group.

According to another aspect of the present invention, there is provided an authority delegating system including a resource server for providing a Web service, and an authorization server, wherein the authorization server comprises: a receiving unit configured to receive from a client an authorization request in which a scope group, with which one or a plurality of scopes that define an extent for using a Web service are associated, is designated; a presenting unit configured to present to a user, in a case where one or more scopes among the one or a plurality of scopes associated with the scope group are included in an extent of an authority that the user has, a screen for accepting an authorization operation corresponding to the authorization request; a first issuing unit configured to issue to the client, in accordance with accepting the authorization operation of the user corresponding to the authorization request via the screen, authorization information relating to the scope group; and a second issuing unit configured to issue, in accordance with accepting an authorization token request based on the authorization information issued by the first issuing unit, an authorization token corresponding to the scope group, and the resource server comprises: an acceptance unit configured to accept a Web service usage request made using the authorization token; an authorization token verification unit configured to perform verification of the authorization token; and a providing unit configured to provide the Web service based on a result of the verification of the authorization token verification unit.

According to another aspect of the present invention, there is provided a non-transitory computer-readable medium storing a program for causing a computer to function as a receiving unit configured to receive from a client an authorization request in which a scope group, with which one or a plurality of scopes that define an extent for using a Web service are associated, is designated; a presenting unit configured to present to a user, in a case where one or more scopes among the one or a plurality of scopes associated with the scope group are included in an extent of an authority that the user has, a screen for accepting an authorization operation corresponding to the authorization request; a first, issuing unit configured to issue to the client, in accordance with accepting the authorization operation of the user corresponding to the authorization request via the screen, authorization information relating to the scope group; and a second issuing unit configured to issue, in accordance with accepting an authorization token request based on the authorization information issued by the first issuing unit, an authorization token corresponding to the scope group.

By virtue of the present invention, in a case where there is a change in user authority in the extent of a scope group, a user can continue to use an API without being forced to once again perform an authorization operation.

Further features of the present invention will become apparent from the following description of exemplary embodiments (with reference to the attached drawings).

BRIEF DESCRIPTION OF THE DRAWINGS

FIGS. 6A, 6B, and 6C are views illustrating an example of a configuration of various tables according to the present application invention.

FIGS. 7A and 7B are views illustrating an example of a configuration of various tables according to the present application invention.

FIG. 11 is a view illustrating an example of a signed authorization token.

FIG. 13 is a flowchart for authority verification processing according to the present invention.

DESCRIPTION OF THE EMBODIMENTS

Figure 1:
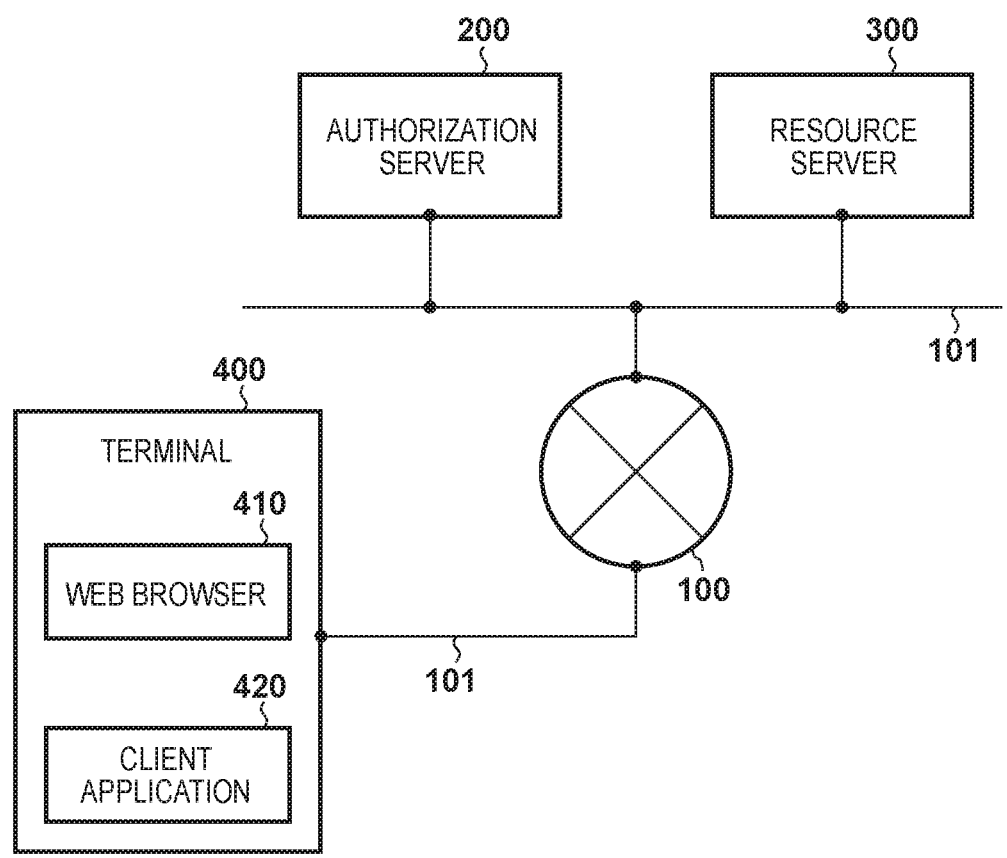
FIG. 1 is a view illustrating an example of a configuration of an authority delegating system according to the present application invention.

As described above, flexibility in an authority delegation protocol such as OAuth 2.0 is required because an extent of resources accessed from a terminal, specifically a scope, for which the extent of service usage is defined, and a user authority change. First of all, changing a scope and a user authority will be described. In the enterprise field, authorities that users have differ depending on the position of the user. For example, there is a difference in the authorities that a user has depending on whether or not they are in a position in which that can access information including a particular level of confidentiality of a company, and scopes in OAuth 2.0 are closely related with the authorities that a user has. In other words, it is envisioned that an authority for enabling access is defined in relation to a scope which indicates an extent of resources in a service, and operation is such that the authority is added for a particular user. Note that user authorities will be changed as appropriate for various reasons because the position of a user will change according to a change in their role in the company or a change in a service. In other words, a user authority for a particular point in time and the user authority at a point in time thereafter will vary, and the extent of a scope for which it is possible for the user to perform an authority delegation for a service will also change.

Meanwhile, in a cloud service, methods and architectures called continuous integration, continuous delivery, and continuous deployment in which new functions are released in short intervals have been getting attention. Also, releasing new functions in short intervals is expected to become even more prevalent due to various tools, development processes, and design methods being provided. Releasing in short intervals means that increasing the number of Web service APIs, expanding the extent of the data that such APIs handle, or changing an extent is performed in short intervals.

In other words, it is envisioned that a change in a scope for which an authority delegation by a user is possible due to a change in the authority of the user, an increase/decrease of a scope according to a short-cycle release, and a change in the definition of a scope will be performed. In the case where said cases arise, and an authority delegation is performed and an authorization token has been issued, it is necessary to issue an authorization token corresponding to the change in user authority and/or the change in scope by causing the user to once again perform an authorization operation.

The present application invention eliminates effort for the authorization operation, and increases convenience, and enables an authorization token operation corresponding to a user authority change and/or a scope change. In the present application invention, a signed authorization token is used as an authorization token. Also, JWT (JSON Web Token) and JWS (JSON Web Signature) are used as the schemes therefor.

In the embodiments described below, service means a function provided to a client by software activated on a server being executed in accordance with a request from a client. Note that there are cases in which a Web application which is software is also referred to as a service. In the embodiments, the description assumes that there are services that a resource server provides as a cloud service, and a user uses the services that the resource server provides via a terminal. Also, the client is software activated on the terminal. The client is configured to be able to access a service via a Web browser that the terminal comprises, or is configured so that it is possible to activate/control software comprising a Web browser function. Also, the description assumes that the resource server exposes APIs as Web services, and services are provided to a user by the client using these APIs.

Note that limitation is not made to the foregoing assumptions, and the client may be configured as another service that cooperates with a resource server. Also, the resource server and the terminal need not be limited to single configurations. For example, a group of servers configured by a plurality of devices may provide services. Accordingly, references to a server in the present application invention encompass cases of a group of servers configured by one or a plurality of devices.

In order for a client to use a resource server API, an authority delegation accompanying a user authorization operation by an OAuth 2.0 Authorization Code Grant, which will be described later, is necessary. In other words, a client that received an authority delegation from a user is enabled to use an API of a resource server.

Next, an example of a service provided by a resource server used in the embodiment of the present application invention is described. The resource server comprises a function in which, in accordance with a request from a non-illustrated multifunction peripheral or printer (hereinafter referred to as a device), various data to be distributed to devices is distributed. In other words, the resource server provides a service that distributes device setting values. Here, the various data may be a setting value for deciding how a device operates, firmware or application information to be installed on a device, or an optional function that can be set on a device. Also, it is possible to include control information indicating what order various data should be set in, license information for installing an application, or the like. In the embodiments, these setting values, setting value control information, and licenses are defined as resources.

Also, in embodiments, something comprising the following is described as an example of a client application function. The client application comprises a function for generating various data to be distributed to a device and uploading it to the resource server as data for each device.

Below, an embodiment of the present invention is described using drawings.

System Configuration

The authority delegating system according to the present embodiment is implemented on a network of the configuration illustrated in FIG. 1. A WAN (Wide Area Network) 100 is an external network, and a WWW (World Wide Web) system is constructed in the present invention, A LAN (Local Area Network) 101 is an internal network, and a plurality of LANs 101 are connected via the WAN 100. In the configuration example in FIG. 1, an authorization server 200 and a resource server 300 are positioned in the same LAN 101, and are connected to a LAN 101 in which a terminal 400 is positioned via the WAN 100.

The authorization server 200 is a server for implementing OAuth 2.0, and an authorization server module is installed therein. In the resource server 300, a resource server module comprising APIs that are exposed as Web services is installed. The terminal 400 comprises a Web browser 410 and a client application 420. The terminal 400 corresponds to a PC (Personal Computer) or a mobile terminal referred to as a smart phone, for example. The client application 420, by using APIs that a resource server module that the resource server 300 comprises exposes, provides, to a user, services together with functions that it provides itself. The terminal 400 communicates with the authorization server 200 using the Web browser 410.

The authorization server 200 and the resource server 300 are connected via the LAN 101. Note that configuration may be such that the authorization server 200 and the resource server 300 are connected via the WAN 100 rather than the LAN 101. Also, the authorization server 200, the resource server 300, and the terminal 400 are each connected to be able to communicate via the WAN 100. Also, configuration may be taken such that the authorization server 200 is connected via the LAN 101 with a database server (not shown), and such that data that the authorization server module uses is stored therein. Also, the resource server 300 and the authorization server 200 may be configured to be on the same server physically.

Figure 2:
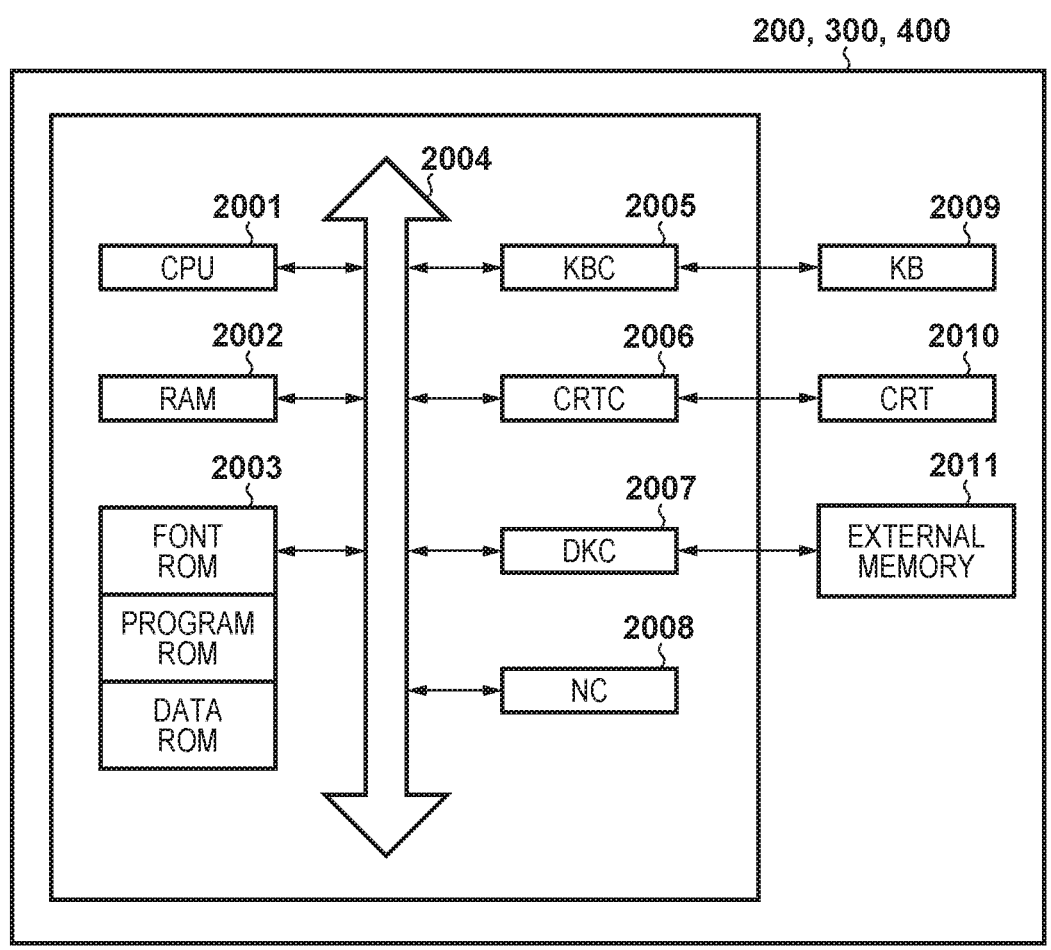
FIG. 2 is a view illustrating an example of a hardware configuration according to the present application invention.

The configuration elements of the authority delegating system according to the present embodiment are implemented in information processing apparatuses of a configuration as illustrated in FIG. 2, for example. FIG. 2 illustrates an example of a hardware configuration of the authorization server 200, the resource server 300, and the terminal 400. Note that limitation is not made to the configuration of FIG. 2 for the servers and the terminal of embodiments. For example, it is possible to apply a typical hardware configuration of an information processing apparatus and a virtual hardware configuration of an information processing apparatus provided as IaaS (Infrastructure as a Service).

A CPU 2001 executes a program such as an OS (Operating System) or an application to control each block connected to a system bus 2004. Various programs are stored in a program ROM of a ROM 2003 and an external memory 2011 such as a hard disk (HD), and these are loaded into a RAM 2002 and executed. Each of the later-described processing sequences is realized by executing various programs.

The RAM 2002 functions as a main memory and a work area and the like for the CPU 2001. A keyboard controller (KBC) 2005 controls key input from a keyboard 2009 and a pointing device (not shown), A CRT controller (CPTC) 2006 controls display of a CRT display 2010. A disk controller (DKC) 2007 controls data access in the external memory 2011 such as a hard disk (HD) that stores various data. A network controller (NC) 2008 executes processing for controlling communication with other devices connected via the WAN 100 and the LAN 101. Note that in the case of a virtual information processing apparatus provided as IaaS, the KBC 2005 and the CRTC 2006 are not comprised, and configuration is such that operations are made from the keyboard 2009 and the CRT display 2010, which are comprised in a terminal connected via the NC 2008.

Note that in the entirety of the following description, the hardware agent of execution in the servers and the terminal is the CPU 2001 unless otherwise specified, and the software agent is an application program installed in the external memory 2011.

Figure 3A:
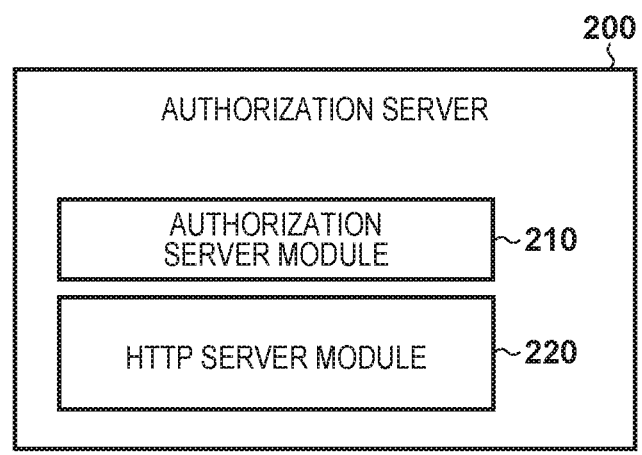
FIGS. 3A and 3B are views illustrating examples of software configurations according to the present application invention.
Figure 3B:
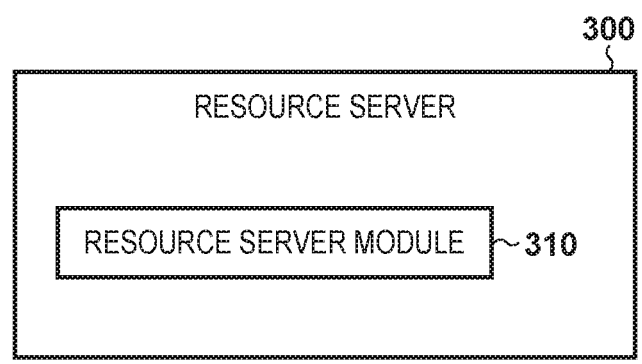

FIG. 3A and FIG. 3B are views illustrating examples of module configurations of the authorization server 200 and the resource server 300 respectively, according to the present embodiment. A service is provided by executing the modules. Note that only modules according to the present embodiment are illustrated, and other modules are abbreviated. The software modules that each apparatus in the authority delegating system has are realized by the CPU 2001 in the respective apparatus executing a program that is loaded into the RAM 2002.

As illustrated in FIG. 3A, the authorization server 200 comprises an authorization server module 210 and an HTTP server module 220. The HTTP server module 220 is a module for performing HTTP communication with the Web browser 410 and the client application 420 installed in the terminal 400 which is connected via the WAN 100. Also, the HTTP server module 220 is configured such that communication by SSL/TLS is possible, and comprises a certificate store (not shown). Also, in the present embodiment, configuration is such that in a case where the later-described authorization request is accepted, a request is made for user authentication by authentication information (a user ID and a password) to the request source.

The authorization server module 210 is a Web application that operates on top of the HTTP server module 220 or in cooperation therewith. The authorization server module 210 accepts a request from the Web browser 410 via the HTTP server module 220, executes processing corresponding to the request, and makes a response thereto. In the present embodiment, a user authentication is accepted in the HTTP server module 220. Configuration is such that then, in the case where the request source authentication succeeds, the authorization server module 210 generates an authentication token with which the authenticated user information is associated, and the authentication token is notified to the authorization server module 210. An authentication token is a token that indicates that a user is authenticated and that the user is logged in, or is a token for verifying whether a user is authenticated. It is possible to identify a user by using an authentication token. A later-described authorization code is information that indicates that a client, for which an authority delegation was performed by an authorization operation of an authenticated user, is permitted to access by using the authority of the user to become the user. Accordingly, the intended uses of an authentication token and an authorization code are different. In particular, in the case of an authentication token, the objective is to confirm a user, whereas with an authorization code, the objective is to confirm an authority.

Also, an authorization token is a token that is obtained by a client using an authorization code, and that indicates that the client has an authority for using an API. The authorization server module 210 has a private key for signing an authorization token. It is possible to sign an authorization token using the private key and then issue the signed authorization token. Also, a refresh token is a token that is similarly obtained using an authorization code, and that indicates that it is possible to reissue an authorization token. The details of processing in the HTTP server module 220 and the authorization server module 210 are described later.

The authorization server module 210 receives an authority verification processing request for an authorization token from a resource server module 310 via the LAN 101. The authorization server module 210 is configured to then perform processing in accordance with this request, and make a response related to whether to permit access to the resource server 300 by the client. This authorization token authority verification processing may be configured as an RPC (Remote Procedure Call) and may be configured as an API of a Web service with which it is possible to communicate via the LAN 101 or the WAN 100 via the HTTP server module 220.

As illustrated in FIG. 3B, the resource server 300 comprises the resource server module 310. The resource server module 310 may be configured to operate on an HTTP server module (not shown). The resource server module 310 comprises APIs exposed as Web services and more specific examples thereof are as previously described. The resource server module 310 accepts a resource request (a usage request) from the client application 420, processes in accordance with the request, and makes a response thereto.

Also, the resource server module 310 holds a public key used when verifying a signature of a signed authorization token that is issued in the authorization server module 210. Alternatively, the resource server module 310 may be configured to obtain a public key via an API that is exposed by the authorization server module 210 and that is for obtaining a public key to be used when verifying a signature. The resource server module 310, in a case where a received authorization token is a signed authorization token, confirms the validity of the authorization token by verifying the signature using this public key. Also, the resource server module 310 can make a request for later-described authorization token authority verification processing to the authorization server module 210 depending on the case.

Processing Sequence

Next, using FIG. 4-FIG. 7B, a sequence of the present embodiment up until the client application 420 uses an API that the resource server module 310 exposes is described. Note that in the sequence diagram, "Ref" indicates a reference, and details thereof will be explained with another figure. Also, "Alt" indicates a branch, and indicates branch processing according to a result of a preceding sequence. Also, "Opt" indicates processing that is executed in a case where the result of previous processing satisfies a condition.

Firstly, data examples of a user table and a client table of the authorization server module 210 according to the present embodiment are illustrated in FIG. 6A and FIG. 6B respectively.

In the present embodiment, as illustrated in FIG. 6A, "admin@xx.com" and "user@xx.com" are registered as users in a user table, and recited authorities are set respectively.

In the present embodiment, as illustrated in FIG. 6B, a client whose client ID is "c001@xx.com" is registered in the client table. How each parameter is used will be described later.

Also, a data example of a scope definition table of the authorization server module 210, according to the present embodiment, is illustrated in FIG. 6C.

In the present embodiment, as user authorities, an administrator authority, a setting value editor authority, a setting value reference authority, and a device setter authority are defined. The administrator authority is an authority with which all of the foregoing operations related to setting-values can be performed. The setting value editor authority is an authority with which a setting value can be edited. The setting value referencer authority is an authority by which a setting value can be referenced. The device setter authority is an authority with which information for specifying a device such as a multifunction peripheral or a printer for which to reflect a setting value is set to a setting value. Normally, an authority and a scope are defined in association, and an extent to which data can be accessed is decided according to a scope. A scope defines an extent to which services that the resource server module 310 provides are used, and whether to permit access to data is decided thereby.

For example, in a case where a "read" scope corresponding to a setting value referencer authority has been defined, the client application 420 can execute an authority delegation protocol by using the "read" scope, and thereby obtain an authorization token corresponding to the "read" scope.

Then, it becomes possible to use an API for referencing various settings values of the resource server module 310 by using the authorization token. However, it is not possible to use an API for editing a setting value with that authorization token. For the client application 420 to edit a setting value, it is necessary to obtain an authorization token by designating an "edit" scope corresponding to a setting value editor authority. Here, designating both "read" and "edit" scopes to the client application 420 when executing the authority delegation protocol can be considered. However, in a case where a setting value editor authority is not added for the user themselves, authorization confirmation processing results in an error, and it is not possible to obtain the authorization token.

Accordingly, in the present embodiment, a definition of a scope group which permits authorization token issuance in authorization confirmation processing in a case where a plurality of scopes are grouped together, and at least one authority is held out of the authorities corresponding to the scopes in the group. More specifically, a scope group called "group" which groups together the scopes "admin", "edit", "read", and "device" is defined, as illustrated in the first line of FIG. 6C. Because "group" is associated with all scopes indicated in FIG. 6C, it is possible for a user, to whom, the group authority is provided, to use all functions that the resource server module 310 provides at the current time. Then, by designating the "group" scope and executing the authority delegation protocol, it becomes possible for a user who only holds the setting value referencer authority to obtain an authorization token.

However, because the user does not hold a setting value editing authority, the user must not be able to use an API for editing a setting value of the resource server module 310 even with an authorization token obtained by designating "group". Accordingly, the authorization server module 210, in relation to the authorization token, signs, reciting only scopes in the extent of the authorities that the user currently holds. Furthermore, the authorization server module 210, every time an authorization token refresh is received, signs, reciting only scopes in the extent of the authorities that the user holds at that point in time. By this scope group processing, even if a change is made in the user's own authority, if the authorization token is obtained by designating "group", it will be possible to use an API corresponding to the authority of the user accompanying a refresh.

Also, a case in which an API requiring the scope "order", which is for changing a setting value control order, for example, is newly added, in the resource server module 310, and a scope definition "order" is added in the authorization server module 210 is considered. Normally, it would be necessary to once again execute an authority delegation protocol, designating the "order" scope. In contrast to this, the "order" scope is defined in association with the scope group "group". By this configuration, as long as an authority is added to the user, it will be possible to use the token to use an API for changing a setting value control order by refreshing the authorization token obtained by designating "group".

Note that in accordance with receiving a request, the authorization server module 210 defines a new scope in a scope definition table. The request here is transmitted in order to define a new scope corresponding to an API in conjunction with implementation of the API which calls a new function added to the resource server 300. At that time, it is possible to associate the new scope with "group", and depending on the case, it is possible to not associate the new scope with "group". A request to define a new scope can be transmitted from a computer (not shown) having the same configuration as the terminal 400. These processes will be described below in detail.

The user described in the sequences of the embodiment is described as using a user ID "user@xx.com" and a password therefor, as illustrated in FIG. 6A.

Also, the client application 420 described in the sequence, as illustrated in FIG. 6B, has various data for a client ID "c001@xx.com": a secret and a redirect URI. The redirect URI is a URI (Uniform Resource Identifier) for the client application 420 to accept an authorization response. These data must be registered in advance in the authorization server module 210, but, as a registration means, a method that uses a screen (not shown) and a means for execution by an API that the authorization server module 210 exposes can be considered. As illustrated in FIG. 6B, the result of these means is that a client whose client ID is "c001@xx.com" is registered.

In step S1.1, a user executes a cooperation start operation (not shown) on the Web browser 410. This cooperation start operation, for example, can be performed via each kind of operation screen (not shown) provided in the client application 420.

In step S1.2, in the Web browser 410, a cooperation start is notified to the client application 420. Note that in the processing of step S1.1 and step S1.2, configuration may be taken such that a user performs operations from the client application 420, and the client application 420 calls the Web browser 410.

In step S1.3, the client application 420, after receiving a cooperation start request, makes an authorization request to the authorization server module 210 via the Web browser 410 and the HTTP server module 220. In the present embodiment, a configuration of the present application invention will be described based on an Authorization Code Grant flow defined in OAuth 2.0 as an authority delegation protocol. Note that in an authorization request, at least the client ID "c:001@xx.com" and the redirect URI "https://localhost:xx" which the previously described client application 420 holds are included. Specifically, in the authorization request is included a scope indicating an extent of a resource for which an authority delegation from a user is made for the client application 420. Here, a case in which the scope "read" is designated and a case in which the scope group "group" is designated are each explained. Note that the redirect URI is a URL of the client application 420 for accepting an authorization code issued at the authorization server 200.

In step S1.4, the HTTP server module 220, after accepting an authorization request from the Web browser 410, verifies whether or not a valid authentication token is included as an HTTP Cookie in a notification from the Web browser 410. If one is included, the HTTP server module 220 notifies the authentication token to the authorization server module 210, and transitions to step S1.9. If one is not included, the processing of steps S1.5 to S1.8 is executed.

Figure 5:
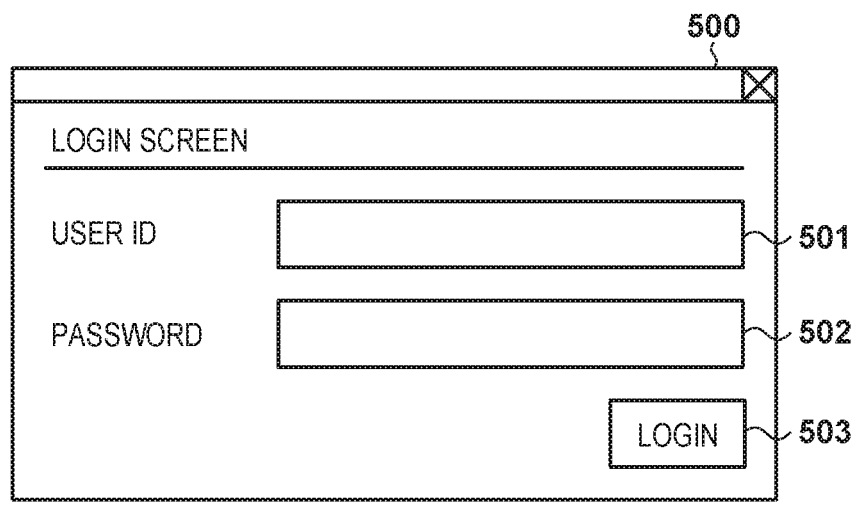
FIG. 5 is a view illustrating an example of a configuration of a login screen according to the present application invention.

In step S1.5, the HTTP server module 220 responds with a login screen 500 for user authentication to the Web browser 410. FIG. 5 illustrates an example of a configuration of the login screen 500 that the HTTP server module 220 responds with. In the present embodiment, configuration is such that the user inputs a user ID and a password, and is authenticated in the case where that the user ID and password set matches with a set of information registered in a user table of the authorization server module 210. Note that other means for authenticating a user, such as an X.509 certificate, or multi-level authentication in which passwords are input a plurality of times, for example, may be configured, and there is no particular limitation.

The login screen 500 illustrated in FIG. 5 is configured to include a user ID input field 501 into which a user ID is inputted, a password input field 502 into which a password is inputted, and a login button 503 for executing a login operation.

In step S1.6, the user inputs the necessary information into the login screen 500 displayed on the Web browser 410, and presses the login button 503. Here, the description assumes that the user ID "user@xx.com" and the password "user" are inputted.

In step S1.7, the Web browser 410 transmits the inputted information (user ID and password) as a login request to the HTTP server module 220.

In step S1.8, the HTTP server module 220 obtains the user ID and the password, compares against sets of user ID and password information of the user table (FIG. 6A), and authenticates the user by verifying whether or not they match. Note that if the HTTP server module 220 fails at the user authentication, in other words the information that is inputted is not registered in the user table, it responds with an authentication error screen (not shown) to the Web browser 410. Here, together with the authentication error screen, the login screen 500 is displayed once again. In the case where a user authentication succeeds, the HTTP server module 220 generates an authentication token. This authentication token is saved in association with a UUID (Universal Unique Identifier) corresponding to a user ID on a non-volatile memory of the authorization server 200, UUIDs are unique IDs (identification information) that do not overlap. Here, a UUID "10000001" corresponding to the user ID "user@xx.com" is saved in association therewith.

In step S1.9, the HTTP server module 220 notifies the generated authentication token to the authorization server module 210, and further performs an authorization request. Note that this authentication token is set as an HTTP Cookie, set in the response from the HTTP server module 220 to the Web browser 410, and notified thereby. Hereinafter, when the authorization server module 210 is accessed from the Web browser 410, authentication token verification, authentication processing, and authentication token notification by the above described HTTP server module 220 is executed, and so description thereof is abbreviated.

In step S1.10, the authorization server module 210, after receiving an authorization request including an authentication token, verifies whether the client ID and redirect URI set in the received authorization request are correct. Specifically, the authorization server module 210 verifies whether the information of the authorization request that was received matches a pair of a client ID and a redirect URI registered in the client table (FIG. 6B). In the case where there is no match, the authorization server module 210 responds to the Web browser 410 via the HTTP server module 220 with an error screen (not shown). In the case of a match, the authorization server module 210 executes scope verification processing in step S2.1. The details of the scope verification processing is described later using FIG. 9.

The authorization server module 210, in a case where the result of the scope verification processing (step S2.1) is a "has authority" response, executes authorization confirmation processing in step S1.11. The authorization server module 210 responds to the Web browser 410 with an authorization confirmation screen as authorization confirmation processing.

Figure 10A:
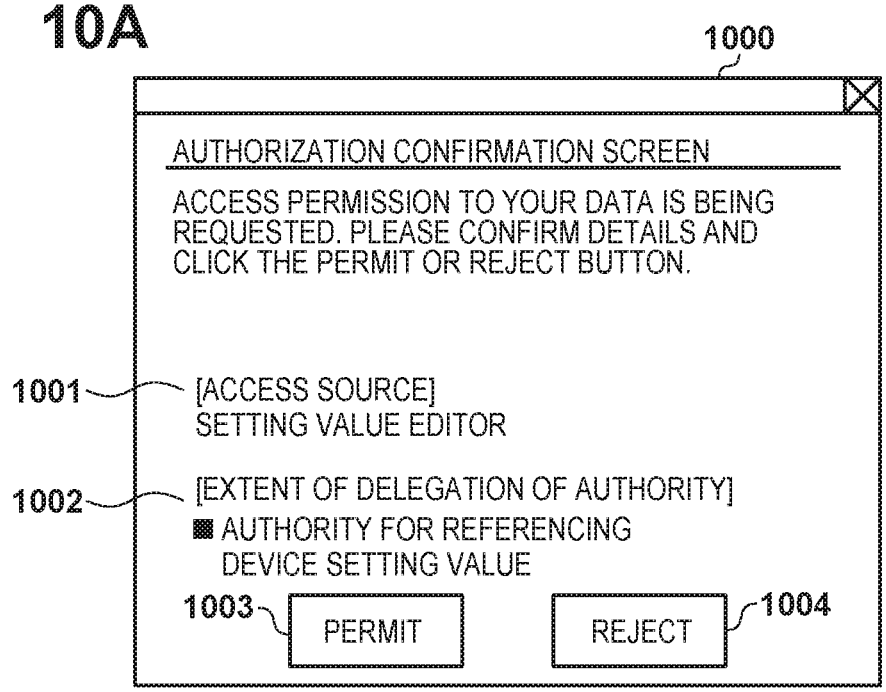
FIGS. 10A and 10B are views illustrating an example of a configuration of authorization confirmation screens according to the present application invention.
Figure 10B:
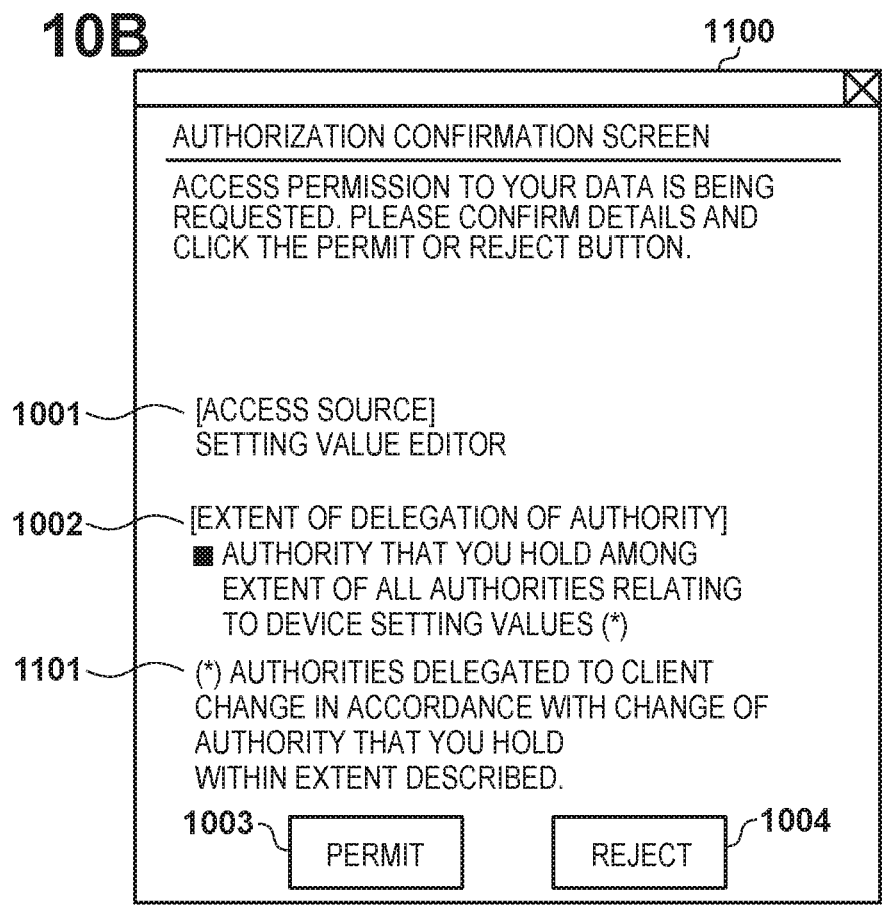

FIG. 10A is an example of a configuration of an authorization confirmation screen 1000 made in a response by the authorization server module 210 in a case where a scope that is not a scope group is designated. Also, FIG. 10B is an example of a configuration of an authorization confirmation screen 1100 made as a response by the authorization server module 210 in a case where a scope group is designated. The same reference numerals are added to portions shared between these screens. The authorization confirmation screens 1000 and 1100 comprise an access source display region 1001 which is a region in which a client name obtained from the client table, where the client ID included in the authorization request is the key, is displayed. Furthermore, the authorization confirmation screens 1000 and 1100 comprise a delegation authority display area 1002 which is a region in which to display a description corresponding to a scope obtained in an authorization request.

In the case of the embodiment, as illustrated in FIG. 6C, a scope that corresponds to all functions in a service provided by the resource server module 310 is associated with "group" which indicates a scope group. Therefore, in the authorization confirmation screen 1100, it is described that the authorities that the user holds, among the authorities corresponding to all scopes, are within an extent of an authority delegation. Note that it is not necessarily necessary to display on the authorization confirmation screen that the authorities that the user holds among the authorities corresponding to all scopes are within the extent of the authority delegation. However, in the case of not displaying that, it is necessary to display that there is the possibility that the client application 420 will use a Web service that the resource server module 310 provides in the extent of one or more scopes associated with the scope group (the extent of admin, edit, read, or device). Also, the authorization confirmation screens 1000 and 1100 comprise a permit button 1003 for a user to execute an operation for authorizing what is described in the information above and a reject button 1004 for executing an operation for rejecting it. Furthermore, as illustrated in FIG. 10B, the authorization confirmation screen 1100 comprises a scope group description region 1101. The scope group description region 1101 is a region for describing that in a case where a scope group is designated, the extent of the authorities to be delegated that are indicated in the delegation authority display area 1002 is changed dynamically according to changes in the authorities of the user.

In accordance with the response from the authorization server module 210, the Web browser 410 presents to the user the obtained authorization confirmation screen 1000 or the authorization confirmation screen 1100. Also, in the case where the user pressed the permit button 1003 or the reject button 1004, the Web browser 410 obtains the authorization confirmation result and notifies the authorization server module 210.

The authorization server module 210 obtains the authorization confirmation result from the Web browser 410. Also, in the case when the obtained authorization confirmation result is "permit", the authorization server module 210 ends the authorization confirmation processing (step S1.11) with an authorization confirmation processing result of "permission response". Meanwhile, in the case when the authorization confirmation result is "reject", the authorization server module 210 ends the authorization confirmation processing (step S1.11) with an authorization confirmation processing result of "rejection response".

Figure 4:
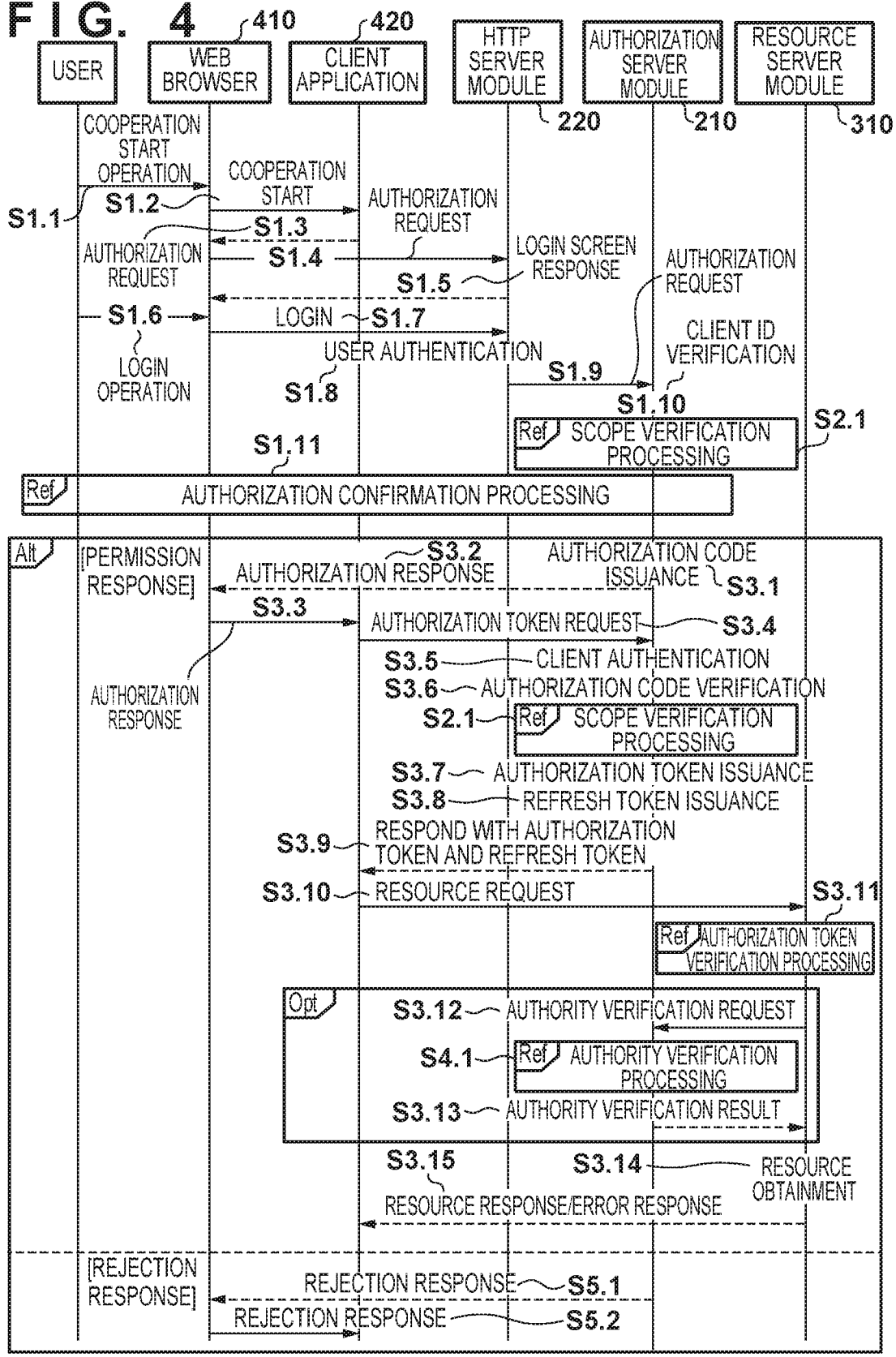
FIG. 4 is a view illustrating an example of an OAuth 2.0 sequence.

Next, in the authorization server module 210, a sequence for the case where the result of authorization confirmation processing (step S1.11) is "permission response" will be described. Specifically, the processing of step S3.1 to step S3.15 in FIG. 4 is performed.

In step S3.1, the authorization server module 210 issues an authorization code. Specifically, the authorization server module 210 issues a token identifier "cd_000001" or "cd_000002". Furthermore, the authorization server module 210 registers the client ID "c001@xx.com" and the redirect URI "https://xx/res" included in the authorization request, the scope, and the UUID "10000001" which corresponds to the user ID of an authenticated user in the token table (FIG. 7A). At that time, the authorization server module 210 treats the token type as the authorization code, and registers the date and time of an expire date until which the authorization code is valid as a validity period.

In FIG. 7A, an example of the token table of the authorization server module 210 is illustrated. In FIG. 7A, a status indicating whether or not the token is valid is registered as "valid", but configuration may be taken to confirm the validity each time by verifying the validity period. As the scope, "read" or "group", which is a scope group, is set.

In step S3.2 and step S3.3, the authorization server module 210 responds with an authorization to the client application 420 via the Web browser 410 by adding the token identifier "cd_000001" or "cd_000002" which is the issued authorization code. Specifically, the authorization server module 210 responds to the Web browser 410 such that the Web browser 410 is redirected to the redirect URI "https://localhost:xx" which was obtained upon the authorization request.

In step S3.4, the client application 420, after receiving an authorization response from the Web browser 410, makes a request for an authorization token to the authorization server module 210. At least, the obtained authorization code "cd_000001" or "cd_000002", the client ID "c001@xx.com", the secret "xxxxxxxxxx", and the redirect URI "https://localhost:xx" transmitted upon the authorization request are included in the authorization token request.

In step S3.5, the authorization server module 210 authenticates the client with the obtained set of the client ID "c001@xx.com" and the secret "xxxxxxxxxx". Specifically, the authorization server module 210 authenticates by verifying whether the obtained information matches a set in the client table (FIG. 6B). Here, if client authentication fails, the authorization server module 210 responds with an authentication error to the client application 420.

If the client authentication succeeds, in step S3.6, the authorization server module 210 verifies the obtained authorization code "cd_000001" or "cd_000002", As the verification of the authorization code, the authorization server module 210 confirms whether the obtained authorization code is registered in the token table (FIG. 7A), and if it is registered, further verifies whether the authorization code is valid. Furthermore, the authorization server module 210 verifies whether or not the client ID "c001@xx.com" and the redirect URI "https://localhost:xx" obtained in the authorization token request match a client ID and a redirect URI in the token table (FIG. 7A). In the case where the result of the authorization code verification is "invalid", the authorization server module 210 responds with an improper token error to the client application 420. Meanwhile, in the case where the result of the authorization code verification is "valid", the authorization server module 210 executes the scope verification processing of step S2.1 in relation to the scope associated with the authorization code. The details of the scope verification processing is described later using FIG. 9.

In the case where the result of the scope verification processing (step S2.1) is "has authority", in step S3.7, the authorization server module 210 issues an authorization token. Specifically, the authorization server module 210 issues the token identifier "at_000001" or "at_000002", and registers the user UUID "10000001" associated with the authorization code, the scope "read" or "group", and the authenticated client ID "c001@xx.com" in the token table. At that time, the authorization server module 210 treats the token type as "authorization token", and registers the date and time of an expire date until which the authorization token is valid as the validity period.

Next, the authorization server module 210 generates a JWT from this information, and calculates a signature value. FIG. 11 is an example of a JWT generated as an authorization token of the token identifier "at_000002". In the exemplification, new lines and indentation are included in the illustration to make it easier to see. In Payload, the token identifier registered in the token table is set for "jti", the UUID of the user is set for "sub", the client ID is set for "azp", and the validity period is set for "exp". Also, one or a plurality of scopes for which the user has an authority obtained in previous processing are set for "owner" in "scopes". In the case where the scope registered in the token table is a scope group, it may be set under "group" in "scopes" additionally. Also, the authorization server module 210, in relation to the generated JWT, generates and adds a signature value (signature information) according to JWS by using a private key that it holds.

Under Encoded in FIG. 11, an example of a signed authorization token that is actually generated is illustrated. However, the signature value is abbreviated. Note that the respective items set in the JWT are not limited to the items that are recited, and, for example, a date and time that a token becomes valid may be set as "nbf" and a time when a token was issued may be set as "iat".

In step S3.8, the authorization server module 210 issues a refresh token. Specifically, the authorization server module 210 issues a token identifier "rt_000001" or "rt_000002". Furthermore, the authorization server module 210 registers the UUID "10000001", the scope, and the authenticated client ID of the user associated with each of the authorization tokens in the token table. At that time, the token type is made to be "refresh token", and the date and time of the expire date until which the refresh token is valid is registered as the validity period. Note that in the case of OAuth 2.0, because it is recommended that control be such that an authorization code can only be used once, the status of the authorization codes of the token identifiers "cd_000001" and "cd_000002" is made to be "invalid". As processing for invalidating a code, instead of changing the value of the status, configuration may be taken to treat it as invalid by updating the validity period to a date and time in the past, and configuration may be taken to invalidate the code by deleting the table record itself.

In FIG. 7B, an example of the token table of the authorization server module 210 is illustrated. In the example, a state in which data is added and changed in relation to the token table of the authorization server module 210 illustrated in FIG. 7A.

In step S3.9, the authorization server module 210 responds to the client application 420 with a signed authorization token for which a signature is added to the issued token identifier "at_000001" or "at 000002" of the authorization token and the token identifier "rt_000001" or "rt_000002" of the refresh token.

In step S3.10, the client application 420, after obtaining the authorization token, makes a resource request in relation to an API that the resource server module 310 exposes. Here, the description assumes that an API for referencing a setting value using a respective signed authorization token is called.

Figure 12:
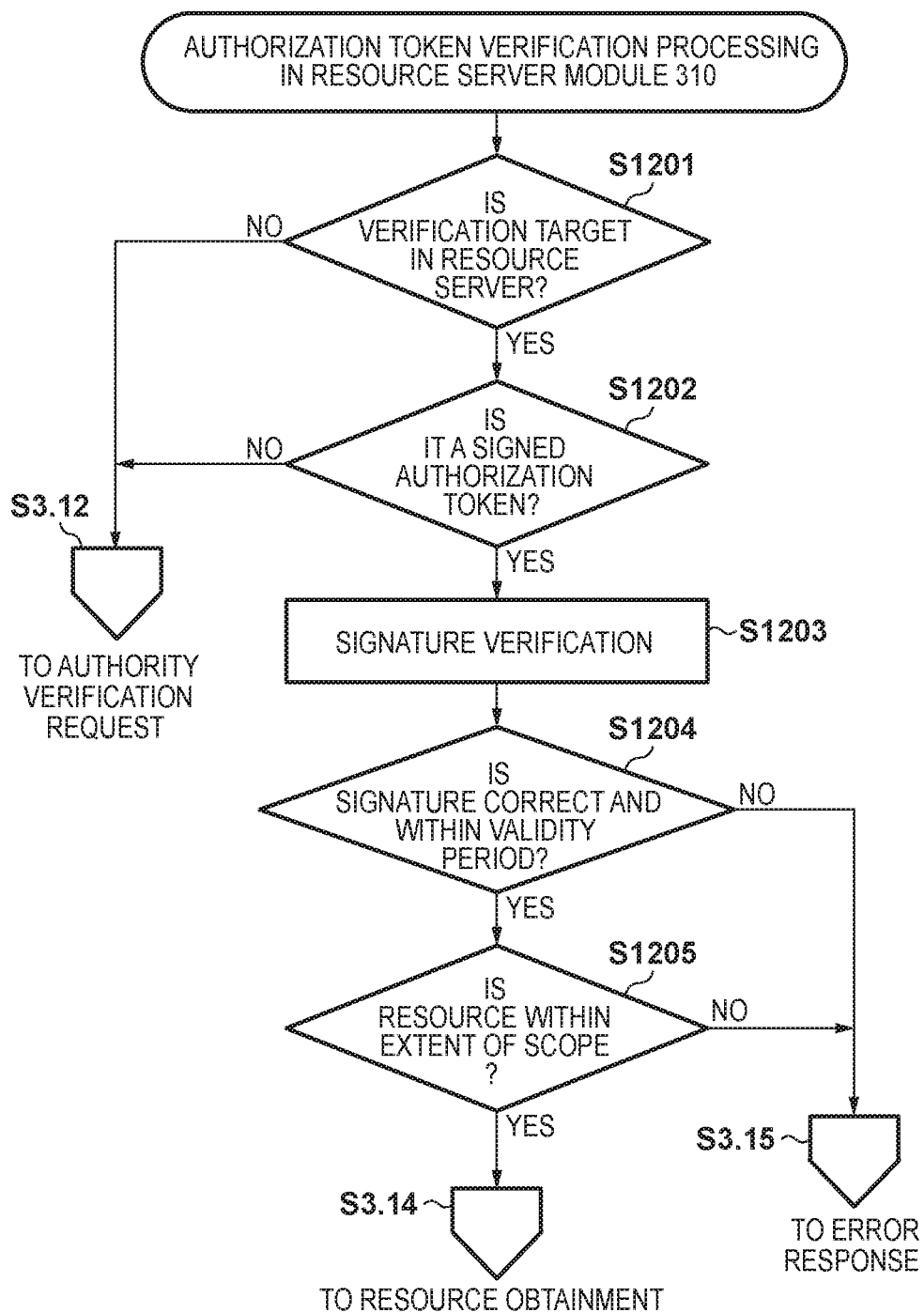
FIG. 12 is a flowchart for authorization token verification processing according to the present invention.

In step S3.11, the resource server module 310, after receiving the resource request, performs authorization token verification processing. FIG. 12 is an authorization token verification process in the resource server module 310.

In step S1201, the resource server module 310 determines whether a resource for which a resource request is made is a resource for which it performs an authority verification itself, or a resource for which a verification request should be made to the authorization server module 210. In the case where it is determined that verification should be requested of the authorization server module 210 (NO in step S1201), the authority verification request processing of step S3.12 is performed. In the case in which it is determined that it is to perform the authority verification itself (YES in step S1201), step S1202 is advanced to.

In this determination, a resource for which an administrator authority is required, for example, is a resource for which it should be confirmed whether or not there is an authority at that point in time. On the other hand, for a signed authorization token, there is a risk that access to a resource will be permitted even if the authority has been lost by the time of the resource request, if there is an authority at the time of the issuance within the validity period that is set. Accordingly, the determination in step S1201 is made in accordance with the validity period set for the signed authorization token and how strictly the authority required for a resource access is managed.

For example, consider a case in which the authority itself costs money, and there is a restriction on the number of authorities that can be added. In such a case, when the validity period of a signed authorization token is sufficiently long, by repeating processing of removing the authority after signed authorization token issuance, and then issuing a signed authorization token after adding an authority to another user, the restriction on the number of authorities that can be added becomes meaningless. In relation to such a problem, whether to perform the verification oneself or to make a request for verification to the authorization server module 210 is switched. As the determination criteria here, in the case where security and strictness are required for predetermined Web service usage, making a request to the authorization server module 210 can be considered.

In step S1202, the resource server module 310 confirms whether or not an authorization token that is added when making a resource request is a signed authorization token. In the case where it is not a signed authorization token (NO in step S1202), the authority verification request processing of step S3.12 is executed. In the case where it is a signed authorization token (YES in step S1202), step S1203 is advanced to. Note that in the case where the authorization server module 210 only issues signed authorization tokens, this processing can be abbreviated.

In step S1203, the resource server module 310 verifies the signature of the signed authorization token that is received using a public key that it holds or that it obtained from the authorization server module 210.

In step S1204, the resource server module 310 determines whether the signature is correct and whether or not the authorization token thereof is within the validity period. In the case where the conditions are not satisfied (NO in step S1204), the error response of step S3.15 is made. Meanwhile, in the case where the condition is satisfied (YES in step S1204), step S1205 is advanced to.

In step S1205, the resource server module 310 determines whether the requested resource is within the extent of a scope recited in the token. At that time, the resource server module 310 makes a determination based on scopes narrowed down to the authorities that are held rather than the scope group. Specifically, using the example of the JWT in FIG. 11, the determination is made using the scopes recited in "owner" of "scopes". In the case where it is determined that the resource is within the extent of the scopes (YES in step S1205), transition is made to the resource obtainment of step S3.14. In the case where it is determined that it is not within the extent (NO in step S1205), the error response of step S3.15 is made.

Next, processing of a case in which it is determined that an authority verification is to be performed in the authorization server module 210 in the authorization token verification processing (step S3.11) of the resource server module 310 is described.

In step S3.12, the resource server module 310 makes a request for an authority verification to the authorization server module 210. At that time, the resource server module 310 passes to the authorization server module 210 the obtained authorization token "at_000001" or "at_000002", and "read" which is the scope of a requested resource which is the verification target.

In step S4.1, the authorization server module 210 performs authority verification processing. The details of authority verification processing according to the authorization server module 210 are described later using FIG. 13.

In step S3.13, the resource server module 310 obtains the result of authority verification processing (step S4.1) from the authorization server module 210.

If the result is permission, the resource server module 310, in step S3.14, obtains the resource, specifically the requested setting value.

In step S3.15, the resource server module 310 responds to the client application 420 with the resource. Note that if the result of the authority verification is rejection, the resource server module 310 skips step S3.14 and responds to the client application 420 with an error.

Next, in the authorization server module 210, a sequence for the case where the result of authorization confirmation processing (step S1.11) is "rejection response" will be described. Specifically, the processing of step S5.1 to step S5.2 in FIG. 4 is performed.

In step S5.1 and step S5.2, the authorization server module 210 responds to the client application 420 with a rejection response via the Web browser 410. More specifically, the authorization server module 210 responds to the Web browser 410 such that the Web browser 410 is redirected to the redirect URI "https://localhost:xx" which was obtained upon the authorization request.

The above is a sequence of the present embodiment that uses an authority delegation protocol that continues up until an API that the resource server module 310 exposes is used by the client application 420. Note that description was given of processing for issuing an authorization token using the example of an Authorization Code Grant of OAuth 2.0, but limitation is not made to this if it is an authority delegation protocol. For example, it is not necessarily required that an authorization code be issued, and it is sufficient if an authorization token that is authorization information is ultimately issued.

Refresh Sequence

Next, using FIG. 8, description will be given of a refresh sequence in which the client application 420 refreshes the authorization token, and an API that the resource server module 310 exposes is used, according to the present embodiment. Note that, "Alt" in FIG. 8 indicates a branch, and indicates branch processing according to a result of a preceding sequence. Also "Opt" means optional, and the processing can be omitted. Note that the same reference numerals are added for the processing that is the same as processing illustrated in FIG. 4, and description thereof is omitted.

There are cases in which this sequence is started from a user operation of step S6.1, and cases in which it the client application 420 starts it during its own processing. For this reason, step S6.1 and step S6.2 are recited as optional.

In step S6.1, a user performs a re-execution operation (not shown) on the Web browser 410. This re-execution operation is, for example, can be performed via each kind of operation screen (not shown) provided in the client application 420.

In step S6.2, in the Web browser 410, a request for re-execution is made to the client application 420. The client application 420, after receiving this re-execution request, makes a resource request with respect to an API that the resource server module 310 exposes, using an already obtained authorization token. Here, the description assumes that authorization token is invalid. Note that processing from the resource request (step S3.10) up until when an error response is returned to the client application 420 by the resource server module 310 (step S3.15) is the same as in the processing flow described using FIG. 4 and so description here is abbreviated.

In step S7.5, the client application 420, after receiving the error response, makes an authorization token refresh request (authorization token reissue request) to the authorization server module 210. At that time, the authorization token, the token identifier "rt_000001" or "rt_000002" obtained in the refresh token response, the client ID "c001@xx.com", and the secret "xxxxxxxxxx" are transmitted.

In step S7.6, the authorization server module 210 authenticates the client using the obtained set of the client ID "c001@xx.com" and the secret "xxxxxxxxxx". Specifically, authentication is performed by verifying whether the obtained information matches with a set in the client table (FIG. 6B). Though not shown, if client authentication fails, the authorization server module 210 responds with an authentication error to the client application 420.

In the case that the client authentication succeeds, in step S7.7, the authorization server module 210 verifies the obtained refresh token. As the authorization code verification, it is confirmed whether the obtained refresh token is registered in the token table, and in the case where the obtained refresh token is registered, it is further verified whether or not the refresh token is valid. Furthermore, the authorization server module 210 verifies whether or not the client ID "c001@xx.com" obtained in the authorization token refresh request matches the client ID in the token table. Processing in a case where the result of refresh token verification is "invalid" will be described later. Here, in the case where the result of the refresh token verification is "valid", the authorization server module 210 executes the scope verification processing (step S2.1) in relation to the UUID and scope of the user associated with the refresh token. The details of the scope verification processing (step S2.1) will be described later.

Next, in the case where the result of the refresh token verification is "valid" and the result of the scope verification processing (step S2.1) is "has authority", the authorization server module 210 issues an authorization token in step S8.1. More specifically, the authorization server module 210 issues a token identifier "at_000003" or "at_000004". Furthermore, the authorization server module 210 registers in the token table (FIG. 7A and FIG. 7B) the UUID "10000001", the scope "read" or "group", and the authenticated client ID "c001@xx.com" of the user associated with the refresh token. At that time, the token type is made to be "authorization token", and the date and time of the expire date until which the authorization token is valid is registered as the validity period. Next, the authorization server module 210 generates a JWT from this information and the scopes obtained as the result of the scope verification processing (step S2.1), and calculates a signature value. Details are abbreviated because they were already described using FIG. 11. Also, the authorization server module 210, in relation to the generated JWT, generates and adds a signature value that accords to the JWS by using the private key that it holds.

Also, the authorization server module 210 may be configured to reissue a refresh token in step S8.2 as a specification of an option of OAuth 2.0. In such a case, in step S8.3, the authorization server module 210 disables the refresh token that was used. Specifically, the authorization server module 210 issues the respective token identifier "rt_000003" or "rt_000004", and further sets the state of the refresh token "rt_000001" or "rt_000002" to "invalid". In the present embodiment, a method in which refresh token reissue processing is not executed is described.

In step S8.4, the authorization server module 210 responds to the client application 420 with the issued signed authorization token.

In step S3.10, the client application 420, after obtaining the authorization token, makes the resource request in relation to the API that the resource server module 310 exposes. The processing thereafter is as was described using FIG. 4.

Next, a sequence in the authorization server-module 210 for the case where the result of the scope verification processing (step S2.1) is an authority error response will be described.

In step S9.1, the authorization server module 210 responds to the client application 420 that a refresh token is "invalid". The client application 420, after receiving the response that the refresh token is invalid, executes the previously described authorization request (step S1.3). Because the processing thereafter is the same as in the sequence described using FIG. 4, the description will be abbreviated.

The above is a refresh sequence in the authority delegation protocol for the client application 420 to refresh an authorization token, and use an API that the resource server module 310 exposes.

Scope Verification Processing

Figure 8:
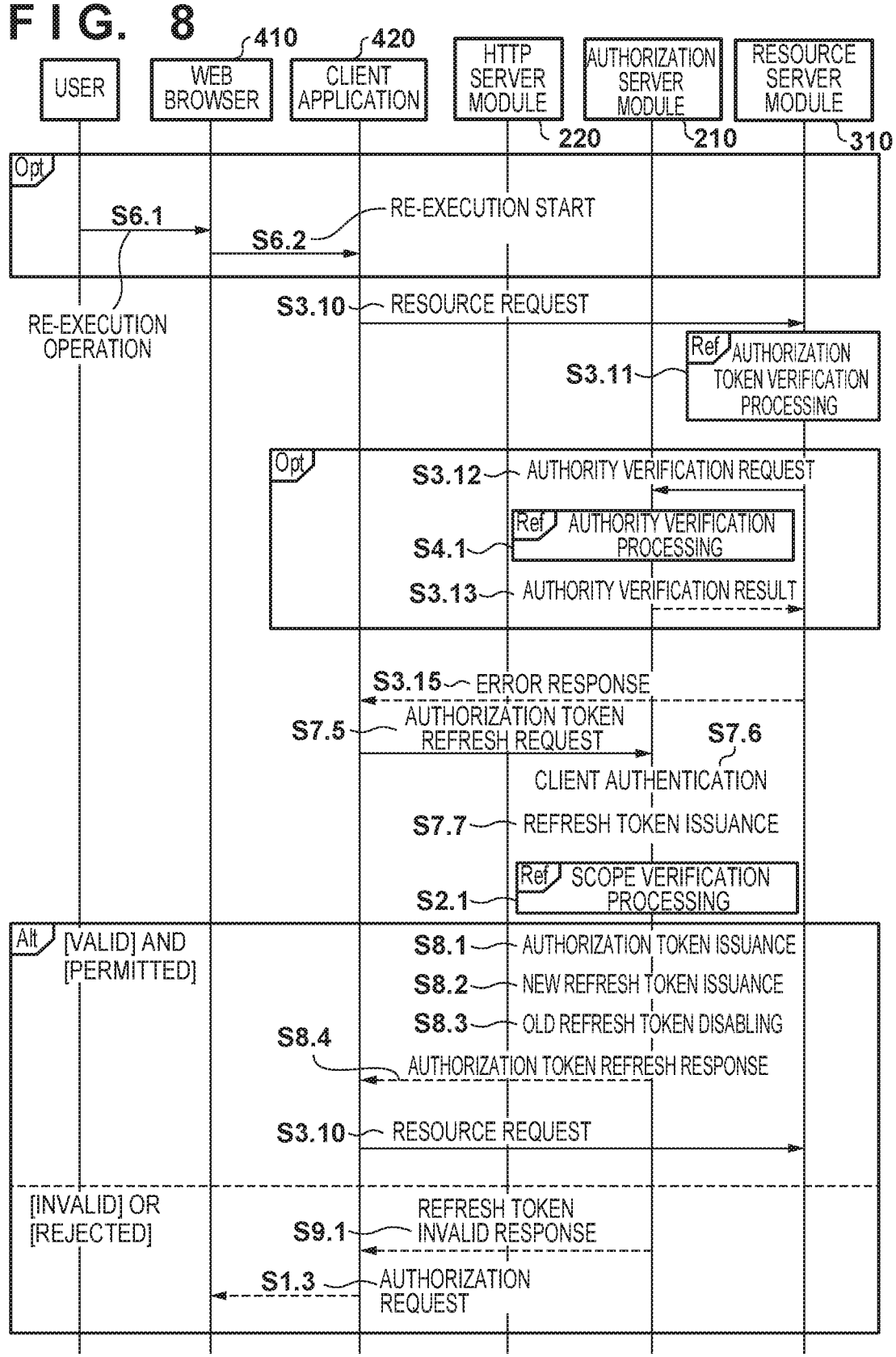
FIG. 8 is a view illustrating an example of an OAuth 2.0 refresh sequence.
Figure 9:
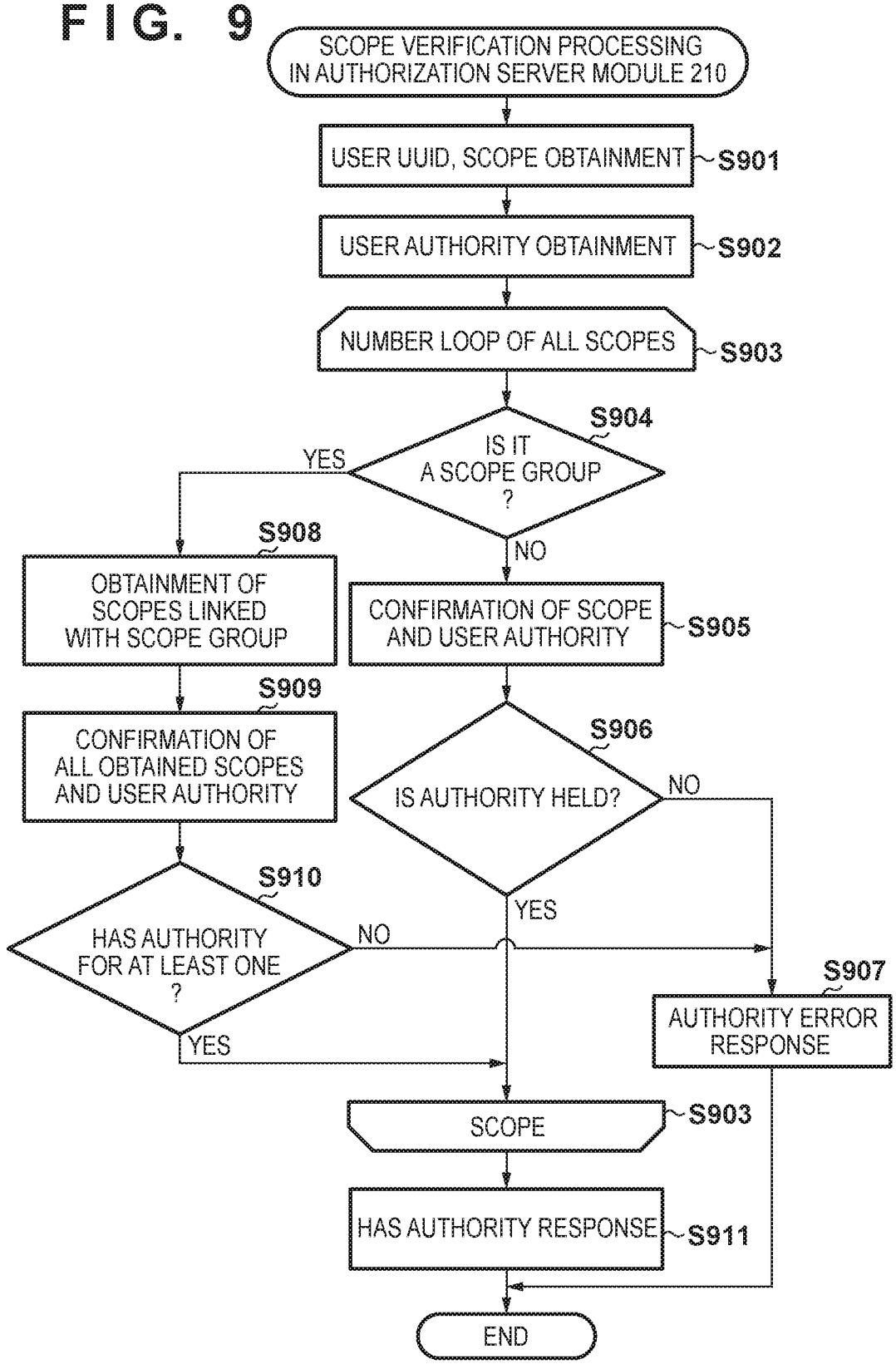
FIG. 9 is a flowchart for scope verification processing according to the present invention.

Continuing on, description regarding the scope verification processing (step S2.1) illustrated in FIG. 4 and FIG. 8 is given using FIG. 9. Issuance or verification of an authorization token according to a scope group described previously becomes possible by using the scope verification processing (step S2.1).

In step S901, the authorization server module 210 obtains the UUID and the scopes of the user. Here, in the UUID "10000001", description is given assuming that the scope is "read" or the scope is "group".

In step S902, the authorization server module 210 obtains the authorities of the user by using the UUID obtained in step S901. More specifically, the authorization server module 210 obtains the authority information "device setter" and "setting value referencer" from the user table of the authorization server module 210 by using the UUID "10000001".

In step S903, the authorization server module 210 repeats step S904 to step S910 once for every one of the scopes obtained in step S901. In the present embodiment, description is given assuming a case in which either "read" or "group" is designated as a single scope (i.e. the number of scopes is one).

In step S904, the authorization server module 210 determines whether or not the scope of the user is a scope group. At that time, the authority information of the scope definition table of the authorization server module 210 is confirmed and in the case where it is "scope-group", it is determined to be a scope group. Note, no limitation is made to this method. For example, additionally, configuration may be taken to increase items for distinguishing whether it is a scope or a scope group, and the format of the scope ID may be made to be a scope ID to which a prefix or a postfix is added so that a scope group can be distinguished by the information that is added. In a case where it is not a scope group (NO in step S904; the case of "read" in the present example), step S905 is advanced to, and in a case where it is a scope group (YES in step S904; the case of "group" in the present example) step S908 is advanced to.

In step S905, the authorization server module 210 confirms the scope and the authority of the user. Specifically, the authorization server module 210 confirms whether or not the authority information of the scope definition table (FIG. 6C) is included in the user authorities obtained in step S902. In other words, it is confirmed whether "setting value referencer" is included in the user authority obtained in step S902 because for the "read" scope, "setting value referencer" is defined as the authority information.

In step S906, as a result of the confirmation of step S905, the authorization server module 210 determines whether or not the authority is held. In a case in which "has authority" is determined (YES in step S906), the processing target is made to be the next scope and the loop processing of step S903 is continued. In a case where the processing has completed for all scopes, step S911 is advanced to. In the case in which "no authority" is determined (NO in step S906), step S907 is advanced to.

In step S907, the authorization server module 210 responds with an authority error. Then, this processing flow ends.

In step S911, the authorization server module 210 responds with the scopes for which the user the authority as "has authority". Then, this processing flow ends. Note, in the present embodiment, "has authority" is determined because "setting value referencer" is included in the user authority.

In step S908, the authorization server module 210 obtains all scopes associated with the scope group. Specifically, the authorization server module 210 obtains the group information from the scope definition table (FIG. 6C). In the present embodiment, the group information of the "group" scope is defined as "admin", "edit", "read", and "device".

In step S909, the authorization server module 210 executes processing for confirming the scope and authority of the user similarly to in step S905 on each of the obtained scopes.

In step S910, the authorization server module 210 determines whether or not the user has the authority for even one of the scopes. In a case where the user has the authority for one of the scopes, the processing target is made to be the next scope, and the loop processing of step S903 continues. At that time, the authorization server module 210 extracts the scopes for which "has authority" was determined in step S909 from among the scopes associated with the scope group. In a case where the processing has completed for all scopes, step S911 is advanced to. Also, in a case where "no authority" is determined for all scopes (NO in step S910), the processing advances to step S907.

In step S911, the authorization server module 210 responds with scopes for which the user has the authority as "has authority". Scopes extracted upon the determination of step S910 are included here. In the present embodiment, since "setting value referencer" and "device setter" are included in the authorities of the user, and furthermore, the authority information of "read" scope and "device" scope respectively match, there are two authorities. As a result, a response is made with the scopes "read", "device", and "group" as "has authority" in step S910.

The above is a description of scope verification processing according to the present embodiment. By using the scope verification processing, for a scope group, it is possible to verify the existence or absence of an authority while extracting scopes for which the user has an authority.

One of the characteristic configurations of the present application invention is that when the client application 420 transmits the authorization token refresh request to the authorization server module 210, the authorization server module 210 performs scope verification processing (FIG. 9) and issues an authorization token. The present application invention envisions authorization processing using a JWT and a JWS. Accordingly, there is demand for a form in which the resource server module 310 executes the authorization token verification processing (FIG. 12) rather than the authorization server module 210, and, as much as possible, the most recent authorization state is considered at the time of the authorization token verification processing. Details are described using FIG. 14A and FIG. 14B.

Authority Verification Processing

Continuing on, details of the authority verification processing (step S4.1) illustrated in FIG. 4 will be described using FIG. 13. By the authority verification processing (step S4.1) according to the present embodiment, if the authorization token was obtained by designating a scope group, authority verification is executed in the extent of the scopes included in the scope group. Then, in the case where the user holds the authorities corresponding to those scopes, the result of the authority verification is determined to be "has authority".

In step S1301, the authorization server module 210 obtains all scopes and the UUID of the user from the obtained authorization token. Here, description will be given respectively for the cases in which "at_000001" and "at_000002" are obtained as the authorization token. In the case of the authorization token "at_000001", the UUID "10000001" of the user, and the scope "read" in the token table (FIG. 7B) of the authorization server module 210 are obtained. In the case of the authorization token "at_000002", the UUID "10000001" of the user, and the scope "group" in the token table (FIG. 7B) of the authorization server module 210 are obtained.

In step S1302, the authorization server module 210 executes the processing of step S1303-step S1304 in a loop once for every obtained scope. In the present embodiment, description will be given with examples of cases in which one scope is obtained respectively.

In step S1303, the authorization server module 210 determines whether or not the obtained scope is a scope group. At that time, the authorization server module 210 confirms the authority information of the scope definition table (FIG. 6C) of the authorization server module 210, and in the case of "scope-group", determines that it is a scope group. Note that limitation is not made to this method, and, additionally, configuration may be taken to increase items for distinguishing whether it is a scope or a scope group, for example, and the format of the scope ID may be made to be a scope ID to which a prefix or a postfix is added so that a scope group can be distinguished by the information that is added. If the scope is not a scope group (NO in step S1303; in the case of the present example, the case where the scope is "read"), the loop processing of step S1302 is continued treating an unprocessed scope as the processing target. Meanwhile, in the case where the scope is a scope group (YES in step S1303; in the case of the present example, the case where the scope is "group"), the processing advances to step S1304.

In step S1304, the authorization server module 210 obtains all scopes associated with the scope group. Specifically, the authorization server module 210 obtains the group information from the scope definition table (FIG. 6C). In the example of FIG. 6C, the group information of the "group" scope is defined as "admin", "edit", "read", and "device". The authorization server module 210 divides the obtained group information, and stores each scope as the target of subsequent processing. Then, an unprocessed scope is made to be the target of processing, and continues the loop processing of step S1302. When the processing has completed for all of the scopes, step S1305 is transitioned to.

In step S1305, the authorization server module 210 obtains the authorities of the user by using the UUID obtained in step S1302. More specifically, the authorization server module 210 obtains the authority information "device setter" and "setting value referencer" from the user table (FIG. 6A) of the authorization server module 210 by using the UUID "10000001".

In step S1306, the authorization server module 210 executes the processing of step S1307-step S1310 looping once for every verification target scope included in the authority verification request. In the present embodiment, description is given assuming that the scope "read", which is for referencing a setting-value, is designated as a verification target scope.

In step S1307, the authorization server module 210 verifies whether or not the verification target scope is included in the one or a plurality of scopes obtained from the token that includes the result of dividing the scope group. If it is determined that the verification target scope is not included therein (NO in step S1307), step S1308 is advanced to, and if it is determined that the verification target scope is included (YES in step S1307), step S1309 is advanced to. In the present embodiment, for the verification target scope "read", since the scope obtained from the authorization token "at_000001" is "read", it is determined to be included, and step S1309 is advanced to. Also, since the scopes obtained from the authorization token "at 000002" are "admin", "edit", "read", and "device", it is determined that it is included, and step S1309 is advanced to.

In step S1308, the authorization server module 210 determines that there is no authority in relation to the verification target scope, and something to that effect is stored as the response. Then, the next unprocessed scope is made to be the target of verification, and the loop processing of step S1307 is continued.

In step S1309, the authorization server module 210 confirms the verification target scope and the authority of the user. Specifically, the authorization server module 210 confirms whether or not the authority information of the scope definition table (FIG. 6C) is included in the user authority obtained in step S1305. Specifically, it is confirmed whether a "setting value referencer" is included in the user authority obtained in step S1305 because for the "read" scope, which is the verification target scope, "setting value referencer" is defined as the authority information.

In step S1310, the authorization server module 210, in a case where "has authority" is confirmed in step S1309, stores that there is authority in relation to the verification target scope. Then, the loop processing of step S1307 is continued, and when the authority verification ends for all of the verification target scopes, step S1311 is advanced to.

In step S1311, the authorization server module 210 responds with the authority verification result, and ends the processing. At that time, the authorization server module 210 responds with all of the stored authority verification results. For example, in the case where a plurality of scopes are included in the verification request, the response is made with the result of the verification corresponding to each of the scopes. In the present embodiment, response is made with the result "has authority" for both "at_000001" and "at_000002". Then, this processing flow ends.

By the authority verification processing according to the present embodiment, if the authorization token is obtained by designating a scope group, the scope group is divided and then verification is performed. For this reason, if within an extent of a scope in the scope group, it becomes possible to execute the user authority verification determination, in other words the processing of step S1309, without executing user authorization processing. In other words, in relation to a change in the authority of the user, it becomes possible to execute authority verification processing corresponding to the user authority without forcing the user to perform authorization confirmation processing once again.

Description of Use Case According to Temporal Sequence

Figure 14A:
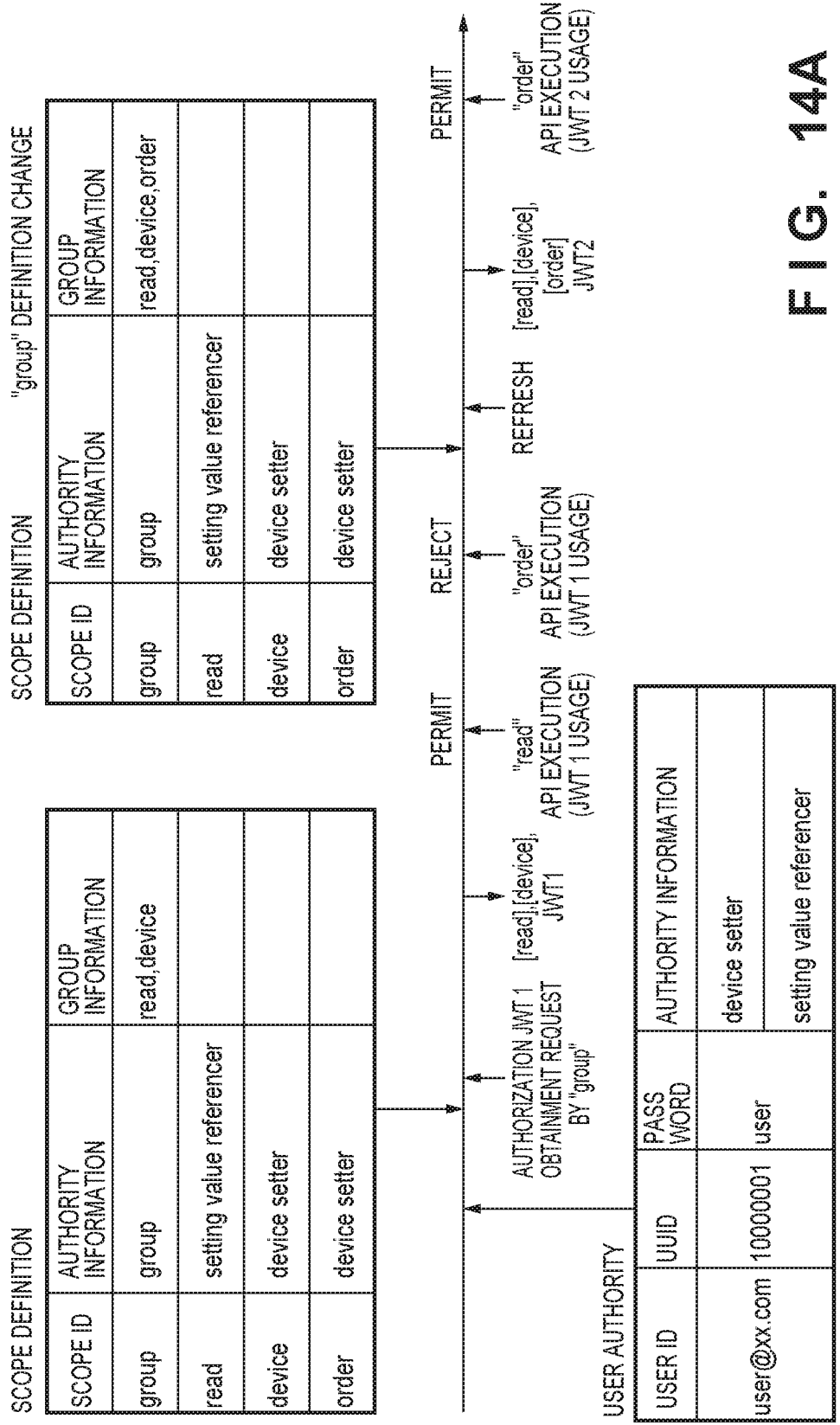
FIGS. 14A and 14B are views illustrating a temporal sequence of an authority and scope change according to the present application invention.
Figure 14B:
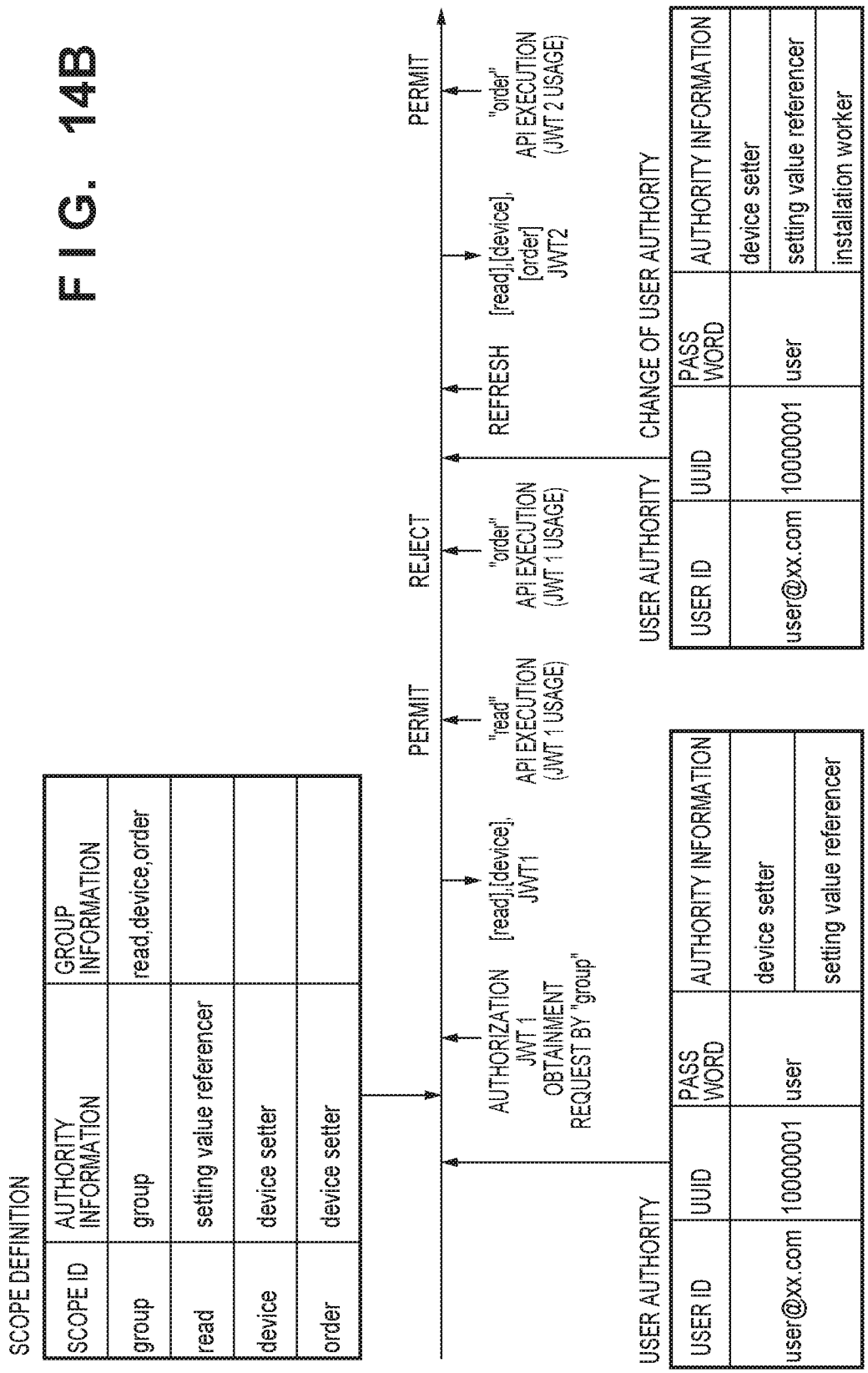

Next, description is given by using FIG. 14A and FIG. 14B of a case in which API usage can be continued without re-authorization of the user being necessary in a case where there is a change in the scope definition with OAuth 2.0 as an example. Furthermore, even in a case where there is a change in the user authority, a case in which API usage can be continued without a re-authorization of the user being necessary is described.

FIG. 14A is a view in which an action of whether to permit a change of a scope definition and an API execution is illustrated by a temporal sequence. The arrow symbol in the rightward direction of FIG. 14A is the time axis. The arrow symbols towards the time axis indicate, for the particular time that the arrow symbol points to, a scope definition, user authority, and API usage from the client application 420 to the resource server module 310, and the result thereof.

Firstly, as illustrated in FIG. 14A, the user (user ID "user@xx.com") holds "device setter" and "setting value referencer" as the authority information. Next, the scope definition is as illustrated in FIG. 14A. In particular, in the scope ID "group", "read", and "device" scopes are included as members thereof.

Assume that in this state, at the client application 420, in the scope "group", a signed authorization token 1 (JWT 1 in FIG. 14A) is obtained. The sequence and flow for obtaining the signed authorization token are as described previously.

As a result, the signed authorization token, in which the scopes of "read" and "device" are described as the scope, is obtained.

Next, the client application 420 executes the API with respect to a resource that requires the scope "read" of the resource server module 310 by using the obtained signed authorization token 1 (JWT 1). At that time, the scope "read" is included in the signed authorization token and the execution of the API succeeds because the signature value is correct. Here, the verification of the signature value is executed by the resource server module 310 instead of the authorization server module 210 (step S3.11 of FIG. 4 and FIG. 12). As a result, authority verification is possible without load being incurred on the authorization server module 210.

Next, the client application 420 executes an API with respect to a resource that requires the scope "order" of the resource server module 310 by using the obtained signed authorization token 1 (JWT 1). At that time, the scope "order" is included in the signed authorization token and the execution of the API is rejected. As described as a problem, if an Authorization Code Grant of OAuth 2.0 is not processed again, designating the scope "order", to obtain another authorization token, the API cannot be used. Accordingly, in the conventional method, it is necessary for the user to execute an authorization operation again.

Next, it is assumed that the scope "order" is added to the members of the scope "group" of the scope definition. After this, the client application 420 executes a refresh of the authorization token (FIG. 8). At that time, a signed authorization token 2, (JWT 2 in FIG. 14A) in which the scopes of "read", "device", and "order" are recited as the scope, is obtained.

Again, the client application 420 executes the API with respect to the resource that requires the scope "order". At that time, the scope "order" is included in the signed authorization token and the execution of the API succeeds because the signature value is correct.

In other words, as long as the authority has been added to the user, in a case where "group" is designated and an authorization token is obtained, an API that requires the scope "order" can be used as is, by performing the refresh. As a result, in a case where a new function is implemented in the resource server module 310, the client application 420 can use an API that calls the function without causing the user to re-execute authorization operation for the authorization token. Furthermore, the verification of the signature value is executed by the resource server module 310 instead of the authorization server module 210 (step S3.11 of FIG. 8 and FIG. 12). As a result, authority verification is possible without load being incurred on the authorization server module 210.

FIG. 14B is a view in which an action of whether to permit a change of a user authority and an API execution is illustrated by a temporal sequence. The arrow symbol in the rightward direction of FIG. 14B is the time axis. The arrow symbols towards the time axis indicate, for the particular time that the arrow symbol points to, a scope definition, user authority, and API usage from the client application 420 to the resource server module 310, and the result thereof.

Firstly, as illustrated in FIG. 14B, the user (user ID "user@xx.com") holds "device setter" and "setting value referencer" as the authority information. Also, the scope definitions are as illustrated in FIG. 14B. In particular, in the scope ID "group", "read", "device", and "order" scopes are included as members thereof. Also, "installation worker" is associated as authority information in relation to the "order" scope.

Assume that in this state, at the client application 420, in the scope "group", the signed authorization token 1 (JWT 1 in FIG. 14B) is obtained. The sequence and flow for obtaining the signed authorization token are as described previously. At this point, the signed authorization token, in which the scopes of "read" and "device" are described as the scope, is obtained. Note that while it is not shown graphically, in the case where obtainment of the signed authorization token 1 (JWT 1) is to be executed by-designating the scope "order", since the user lacks the authority, as described in the flow (FIG. 9), obtainment fails.

Next, the client application 420 executes the API with respect to a resource that requires the scope "read" of the resource server module 310 by using the obtained signed authorization token 1 (JWT 1). The scope "read" is included in the signed authorization token and the execution of the API succeeds because the signature value is correct. At that time, the verification of the signature value is executed by the resource server module 310 instead of the authorization server module 210. As a result, authority verification is possible without load being incurred on the authorization server module 210.

Next, the client application 420 executes an API with respect to a resource that requires the scope "order" of the resource server module 310 by using the obtained signed authorization token 1 (JWT 1). At that time, the scope "order" is included in the signed authorization token and the execution of the API is rejected. What is described up until this point is a state described as a problem to be solved.

Next, the authority of "installation worker" is added to the user (the user ID "user@xx.com"). After this, the client application 420 executes a refresh of the authorization token (FIG. 8). As a result, a signed authorization token 2, (JWT 2 in FIG. 14B) in which the scopes of "read", "device", and "order" are recited as the scope, is obtained.

Again, the client application 420 executes the API to the resource that requires the scope "order". As a result, the scope "order" is included in the signed authorization token 2 (JWT 2) and the execution of the API succeeds because the signature value is correct.

Specifically, in the case where there is a change in the user authority, it is possible to allow usage of an API requiring the scope "order" as is without forcing the user to once again perform an authorization operation. Also, the verification of the signature value is executed by the resource server module 310 instead of the authorization server module 210. As a result, authority verification is possible without load being incurred on the authorization server module 210.

In the above, in the present embodiment, a scope group is defined, and an authority delegation is performed using the scope group. Thereby, even if there is a change in the authority of the user, it is possible to continue API usage within an extent of the authority of the user that is changed without prompting the user to once again perform an authorization operation. Also, even if there is a change in a scope accompanying implementation of a new function of a service, similarly, it is possible to continue to use APIs including an API corresponding to the new function in accordance with the authority of the user without prompting the user to once again perform an authorization operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform, the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest, interpretation so as to encompass all such modifications and equivalent structures and functions.

This application claims the benefit of Japanese Patent Application No. 2016-225381, filed Nov. 18, 2016, which is hereby incorporated by reference herein in its entirety.

What is claimed is:

1. An authorization server, comprising:
a memory storing instructions, and
at least one processor executing the instructions to cause the authentication server to:
receive from a client an authorization request in which a scope group, with which one or a plurality of scopes that define an extent for using a Web service are associated, is designated;
present to a user, in a case where one or more scopes among the one or a plurality of scopes associated with the scope group are included in an extent of an authority that the user has, a screen for accepting an authorization operation corresponding to the authorization request;
issue to the client, in accordance with accepting the authorization operation of the user corresponding to the authorization request via the screen, authorization information relating to the scope group; and
issue, in accordance with accepting an authorization token request based on the issued authorization information, an authorization token corresponding to the scope group,
wherein upon issuing an authorization token corresponding to the scope group, an authorization token that is signed with reciting only scopes in the extent of the authority that the user currently has is issued,
upon issuing an authorization token corresponding to the scope group, a refresh token for reissuing the authorization token is issued additionally,
in a case where a request to reissue the authorization token using the refresh token is accepted, the authorization token is reissued based on the one or a plurality of scopes associated with the scope group when the request to reissue was accepted, and
verification of the authorization token is performed by a resource server for providing a Web service.

2. The authorization server according to claim 1, wherein upon accepting an authorization operation of a user, the user is presented that the client will become capable of using the Web service in the extent of the one or a plurality of scopes associated with the scope group.

3. The authorization server according to claim 1, wherein upon accepting the authorization token request, the authorization token is issued in a case where the one or more scopes among the one or a plurality of scopes associated with the authorization information are included in an extent of authority that the user has.

4. The authorization server according to claim 1, wherein upon reissuing the authorization token, a new refresh token is additionally issued.

5. The authorization server according to claim 1, wherein upon issuing the authorization token, signature information is added.

6. The authorization server according to claim 5, wherein for the authorization token, a JSON Web Token is used, and for the signature information, a JSON Web Signature is used.

7. An authority delegating system including a resource server for providing a Web service, and an authorization server, wherein
the authorization server comprises:
a memory storing instructions, and
at least one processor executing the instructions to cause the authentication server to:
receive from a client an authorization request in which a scope group, with which one or a plurality of scopes that define an extent for using a Web service are associated, is designated;
present to a user, in a case where one or more scopes among the one or a plurality of scopes associated with the scope group are included in an extent of an authority that the user has, a screen for accepting an authorization operation corresponding to the authorization request;
issue to the client, in accordance with accepting the authorization operation of the user corresponding to the authorization request via the screen, authorization information relating to the scope group; and
issue, in accordance with accepting an authorization token request based on the authorization information issued by the authorization server, an authorization token corresponding to the scope group, and
the resource server comprises:
a memory storing instructions, and
at least one processor executing the instructions to cause the resource server to:
accept a Web service usage request made using the authorization token;
perform verification of the authorization token; and
provide the Web service based on a result of the verification,
wherein upon issuing an authorization token corresponding to the scope group, an authorization token that is signed with reciting only scopes in the extent of the authority that the user currently has is issued, in the authorization server, upon issuing an authorization token corresponding to the scope group, a refresh token for reissuing the authorization token is additionally issued, and in the authorization server, in a case where a request to reissue the authorization token using the refresh token is accepted, the authorization token is reissued based on the one or a plurality of scopes associated with the scope group when the request to reissue was accepted.

8. The authority delegating system according to claim 7, wherein in the verification, the resource server verifies whether or not a permitted scope, that the authorization token indicates, indicates an extent in which a provision of the Web service requested in the usage request is permitted.

9. The authority delegating system according to claim 7, wherein the at least one processor of the resource server executes the instructions stored in the memory of the resource server to further cause the resource server to determine whether to make a request for verification of the authorization token to the authorization server or to perform verification by the resource server.

10. A non-transitory computer-readable medium storing a program for causing a computer to function to:

receive from a client an authorization request in which a scope group, with which one or a plurality of scopes that define an extent for using a Web service are associated, is designated;

present to a user, in a case where one or more scopes among the one or a plurality of scopes associated with the scope group are included in an extent of an authority that the user has, a screen for accepting an authorization operation corresponding to the authorization request;

issue to the client, in accordance with accepting the authorization operation of the user corresponding to the authorization request via the screen, authorization information relating to the scope group; and issue, in accordance with accepting an authorization token request based on the issued authorization information, an authorization token corresponding to the scope group, wherein upon issuing an authorization token corresponding to the scope group, an authorization token that is signed with reciting only scopes in the extent of the authority that the user currently has is issued, upon issuing an authorization token corresponding to the scope group, a refresh token for reissuing the authorization token is additionally issue, and in a case where a request to reissue the authorization token using the refresh token is accepted, the authorization token is reissued based on the one or a plurality of scopes associated with the scope group when the request to reissue was accepted, and verification of the authorization token is performed by a resource server for providing a Web service.

* * * * *